United States Patent
Nomura et al.

(10) Patent No.: US 6,490,692 B1
(45) Date of Patent: *Dec. 3, 2002

(54) IMAGE FORMING APPARATUS WITH IMPROVED MONITORING SYSTEM FOR OPERATION OF MICROPROCESSOR CONTROLLING IMAGE FORMING OPERATION

(75) Inventors: Keiichi Nomura, Amagasaki; Yoshiaki Takano; Kentaro Nagatani, both of Toyohashi, all of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/361,390

(22) Filed: Dec. 22, 1994

(30) Foreign Application Priority Data

Dec. 27, 1993 (JP) ............................................. 5-332438

(51) Int. Cl.⁷ ................................................. H02H 3/05
(52) U.S. Cl. ............................................. 714/15; 714/2
(58) Field of Search ........................ 395/182.13, 182.14, 395/181, 182.18, 182.19, 182.21, 185.04; 714/15, 16, 2, 20, 21, 23, 51

(56) References Cited

U.S. PATENT DOCUMENTS

| | | | |
|---|---|---|---|
| 4,569,585 A | * | 2/1986 | Masuda .................... 355/14 R |
| 4,618,953 A | | 10/1986 | Daniels et al. |
| 4,811,200 A | | 3/1989 | Wagner et al. |
| 5,034,780 A | * | 7/1991 | Kotabe et al. ............... 355/316 |
| 5,068,853 A | * | 11/1991 | Soma et al. ................ 371/16.3 |
| 5,138,376 A | | 8/1992 | Maruta et al. |
| 5,138,701 A | | 8/1992 | Ohira et al. |
| 5,311,254 A | * | 5/1994 | Watanabe .................... 355/206 |
| 5,386,271 A | * | 1/1995 | Maekawa et al. ............ 355/204 |
| 5,414,531 A | * | 5/1995 | Amemiya et al. .......... 358/465 |

FOREIGN PATENT DOCUMENTS

| | | |
|---|---|---|
| JP | 60-209847 | 10/1985 |
| JP | 60-209849 | 10/1985 |
| JP | 2-113262 | 4/1990 |
| JP | 4-70770 | 3/1992 |
| JP | 6-019247 | 1/1994 |

* cited by examiner

Primary Examiner—Dieu-Minh Le
(74) Attorney, Agent, or Firm—Burns, Doane, Swecker & Mathis, LLP

(57) ABSTRACT

A first microprocessor controls the operation of a document conveying device, and a second microprocessor controls the operation of a copying device. A third microprocessor connected to the first and second microprocessors monitors the operation state of each of the first and second microprocessors. When an abnormality occurs in one of the first and second microprocessors, the third microprocessor determines an image forming operation controllable only by the other microprocessor. The third microprocessor makes the other microprocessor execute the determined image forming operation.

11 Claims, 23 Drawing Sheets

```
COPYING COMPLETED
FEE:
    ¥20 × 30SHEETS = ¥600
```

(b)

| ✱✱✱MAINTENANCE MODE✱✱✱ |
| --- |
| ◇WDT TIME UP DATA |

| No. | NUMBER OF OCCURRENCE | FREQUENCY |
| --- | --- | --- |
| WDT1 | 12 TIMES | 0.05%(NORMAL) |
| WDT2 | 5 TIMES | 0.01%(NORMAL) |

```
✱✱✱MAINTENANCE MODE✱✱✱
◇TOTAL COUNTER COUNT VALUE 1 2 3 4 5
```

(c)

```
ENGINE CPU IS UNCONTROLLABLE
AND MACHINE IS STOPPED.
REMOVE PAPER AROUND
DISCHARGE PORTION.
```
→
```
RESTART WITH COPY KEY ON.

×1.000

A3              3 SHEETS TO GO
```

(d)

```
ENGINE CPU MALFUNCTIONING.
COPYING NOT POSSIBLE.
```

```
ADF MALFUNCTIONING.
ADF UNUSABLE.

A4                     1 SHEET
```

IMAGE FORMING APPARATUS WITH IMPROVED MONITORING SYSTEM FOR OPERATION OF MICROPROCESSOR CONTROLLING IMAGE FORMING OPERATION

BACKGROUND OF THE INVENTION

1. Field of the Invention

The present invention relates generally to image forming apparatuses, and more particularly, to an image forming apparatus having an abnormality monitoring circuit for monitoring the operation of a microprocessor which conducts processings for image forming operation.

2. Description of the Related Art

Today, most image forming apparatuses such as copying machines and printers are provided with a microprocessor which controls image forming operation. Since a microprocessor sometimes becomes uncontrollable by the influence of noise, for example, various techniques have been suggested for preventing such states. There is an apparatus in which a timer called watchdog timer is connected to a microprocessor, and if the timer does not receive a restart signal from the microprocessor within a prescribed time period until the timer is up, a reset signal is transmitted to the microprocessor to reset the microprocessor, based on the determination that the microprocessor is in an uncontrollable state.

In such an apparatus as the watchdog timer described above which resets the microprocessor in an uncontrollable state to return it to its normal operation state, the microprocessor in the uncontrollable state is simply reset, and therefore, the history that the microprocessor has attained the uncontrollable state is not stored once the microprocessor is restarted and initiates a normal operation. Therefore, with a malfunctioning microprocessor, the image forming apparatus on the whole cannot be apparently distinguished from its normal state, and the malfunctioning microprocessor may continue to be inside the image forming apparatus, which degrades the reliability of the operation of the image forming apparatus.

Furthermore, conventionally, all microprocessors are instructed to stop controlling once an abnormality occurs in a single microprocessor and the image forming apparatus immediately stops operating once such an abnormality occurs. However, this is not efficient, because control by a normal microprocessor is also stopped in the timing in which another microprocessor is encountered with an abnormality.

SUMMARY OF THE INVENTION

It is an object of the invention to improve operation reliability in an image forming apparatus whose each image forming operation is controlled by a microprocessor.

Another object of the invention is to determine a low reliability microprocessor in an image forming apparatus whose each image forming operation is controlled by a plurality of microprocessors.

Yet another object of the invention is to permit efficient controlling operation making the best of normal microprocessors even if one microprocessor suffers from an abnormality, in an image forming apparatus whose each image forming operation is controlled by a plurality of microprocessors.

In order to achieve the above-described objects, an image forming apparatus according to an aspect of the invention includes a microprocessor for conducting processings for image forming operation, and an abnormality monitoring circuit for monitoring the microprocessor and resetting the microprocessor by transmitting a reset signal to the microprocessor upon detecting an abnormality, wherein the abnormality monitoring circuit includes first storage means for storing how many times the abnormality monitoring circuit has transmitted the reset signal.

The image forming apparatus having the above-described structure is capable of storing the number of transmission of the reset signal, and therefore a low reliability microprocessor can readily be determined.

In order to achieve the above-described objects, an image forming apparatus according to another aspect of the invention includes first and second microprocessors which cooperate to control image forming operation, a monitoring circuit for monitoring the operation of the first and second microprocessors and transmitting a reset signal to a microprocessor with an abnormality and a third microprocessor, upon occurrence of an abnormality in any of the microprocessors, for determining an image forming operation controllable only by the other microprocessor and making the other microprocessor execute thus determined image operation.

The image forming apparatus having such a structure is capable of efficient controlling operation, because if one microprocessor suffers from an abnormality, an image forming operation controllable by the other microprocessor is continued. Furthermore, the image forming operation can readily be resumed after the microprocessor with the abnormality is restored.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a representation showing various examples of displays by display panel 72 provided at operation panel 70 in FIG. 2;

DESCRIPTION OF THE PREFERRED EMBODIMENTS

The present invention will be now described in conjunction with the accompanying drawings.

Figure 1:
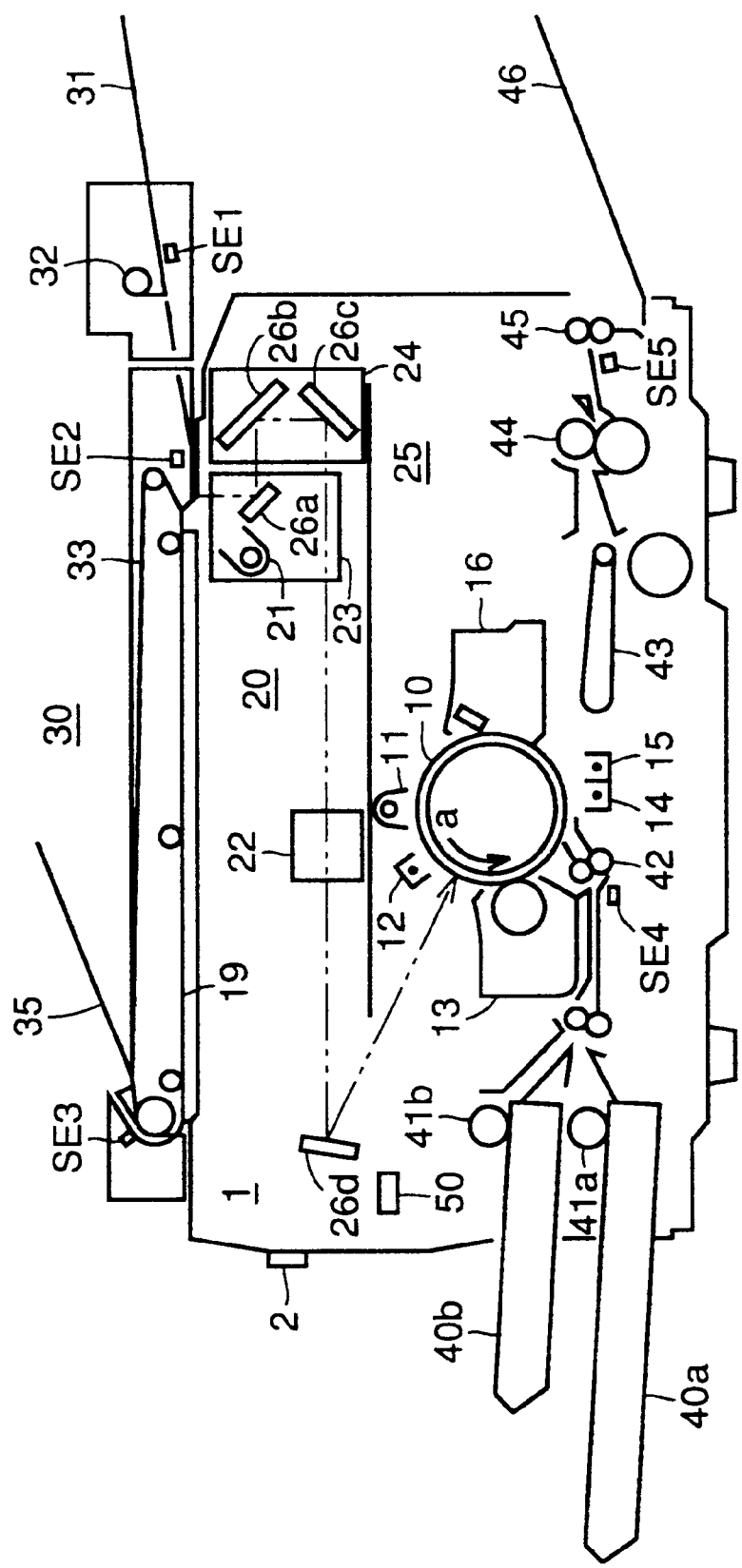
FIG. 1 is a cross sectional view schematically showing the structure of an electrophotographic copying machine according to one embodiment of the invention.

FIG. 1 is a cross sectional view showing an electrophotographic copying machine according to one embodiment of the invention.

As illustrated in FIG. 1, the copying machine includes a copying unit 1 provided with various devices for forming images on paper, and an automatic document feeding device (ADF) 30 for feeding a document.

On the top of copying unit 1 provided are a document station glass 19 for installing a document and a scanning optics 20 for scanning the document on document station 19 with exposure light. Scanning optics 20 includes an illumination lamp 21 for illuminating the document, a first mirror 26a, a second mirror 26b and a third mirror 26c for guiding light reflected from the surface of the document to a projection lens 22, and a fourth mirror 26d for reflecting light passed through lens 22 and forming an image on the surface of a photoreceptor drum 10 provided substantially in the center of copying unit 1. A scanner 25 formed of a first slider 23 including illumination lamp 21 and first mirror 26a and a second slider 24 including second mirror 26b and third mirror 26c is at a prescribed position at an end of copying unit 1 (scanning start position) in its stand-by state as illustrated in FIG. 1. In a copying operation, the scanner is moved from the scanning start position to the left in the figure along the document surface at a prescribed speed, the entire surface of the document is subjected to sequential slit exposure and the entire image of the document is projected on photoreceptor drum 10.

Photoreceptor drum 10 is provided rotatably in the direction of arrow a in the figure, and the image projected on photoreceptor drum 10 is formed into a toner image formed according to a well known electrophotographic process by an erasure lamp 11, a corona charger 12, a developing device 13, a transfer charger 14, a separation charger 15, and a cleaner 16 provided in this order around photoreceptor drum 10.

Paper feeding cassettes 40a and 40b storing sheets of paper of different sizes are provided on a side of copying unit 1, and the sheets of paper in the paper feeding cassettes are supplied into the copying unit on a sheet-by-sheet basis by paper feeding rollers 41a and 41b. Thus supplied paper sheet stops upon contacting a timing roller 42. The sheet is sent to the portion (transfer portion) at which transfer charger 14 and photoreceptor drum 10 oppose each other by means of timing roller 42 which rotates synchronously with scanning optics 20. The above-described toner image is transferred onto the sheet of paper sent to the transfer portion, and the sheet is separated from photoreceptor 10 by separation charger 15. The sheet is then conveyed by conveying belt 43 and subjected to heat fixation of the toner image by a fixing roller 44 and discharged onto a discharge tray 46 by a discharger roller 45.

An openable cover (not shown) is provided in the front of copying unit 1, and a sheet of paper jamming in copying unit 1 can be removed by opening the cover. Copying unit 1 is provided with a maintenance key 50 operable when the cover is opened. Maintenance key 50 is used for maintenance of the copying machine, and key 50 is operated to display the values of various counters provided in the copying machine on the display panel which will be described later. A power supply switch 2 for turning on copying unit 1 and ADF 30 is provided on the side of copying unit 1.

A plurality of optical sensors for detecting the position of a paper sheet in the unit is provided in copying unit 1. A sensor SE4 for detecting a completion of paper feeding from paper feeding cassette 40 is provided in the vicinity of timing roller 42. A sensor SE5 for detecting a completion of paper discharge is provided in the vicinity of discharge roller 45.

ADF 30 includes a document tray 31 for placing a document to be copied, a conveying belt 33 for conveying the document, and a discharge tray 35 for placing the document after copied. ADF30 is placed on the top of copying unit 1, and can be opened/closed with respect to document station 19. When in use, ADF30 is closed and conveying belt 33 is opposed to document station 19. Once copying is started with a document set on document tray 31, the document is conveyed toward document station 19 on a sheet basis by sending roller 32 and conveying belt 33, and set at a prescribed position on document station 19. The document on document station 19 is conveyed by conveying belt 33 after copied and discharged onto discharge tray 35. When ADF30 is not used, ADF30 is opened and a document is manually set for copying. Note that the vicinities of the inlet and outlet of ADF 30 are covered with openable covers, respectively, and a document can be removed by opening the cover when paper jamming takes place within ADF 30.

A plurality of sensors for detecting the position of a document in the ADF is provided in ADF 30. Document tray 31 is provided with a sensor SE1 for detecting the presence/absence of a document on document tray 31. A sensor SE2 for detecting a completion of setting of a document on document station glass 19 is provided between document tray 31 and conveying belt 33. At the outlet for discharging a document onto discharge tray 35, a sensor SE3 for detecting a completion of discharge of a document is provided.

Figure 2:
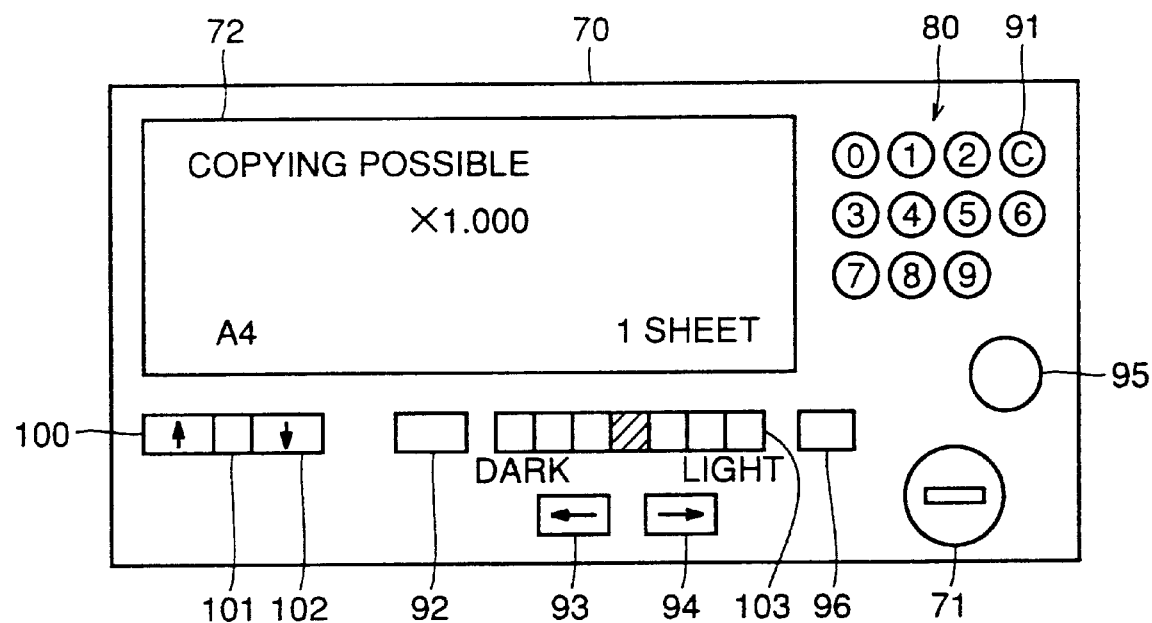
FIG. 2 is a view showing an. operation panel formed on the copying machine in FIG. 1.

FIG. 2 shows operation panel 70 provided on the top of copying unit 1 in FIG. 1.

Operation panel 70 is provided with a print key 71 for instructing initiation of copying, a ten key 80 for setting the number of copying by inputting a number using 1 to 0, a clear key 91 for clearing the input number of copying, a paper sheet select key 92 for selecting a kind of paper for copying, a density up key 93 and a density down key 94 for adjusting the density of images, a magnification up key 100, an equal scale magnification key 101 and a magnification down key 102 for changing magnification for copying, a reset key 95 for resetting copying conditions set by operating the above keys, a mode select key 96 for selecting a 2 in 1 mode for copying original images for two sheets in a single sheet, an LCD panel 72 for displaying copying conditions such as copying magnification and various messages, and an LED103 for displaying the copying density. LCD panel 72 conducts copying number display, copying magnification display and message display for notifying the size of paper sheet and operation immediately after turning on the power supply as illustrated in FIG. 2.

Figure 3:
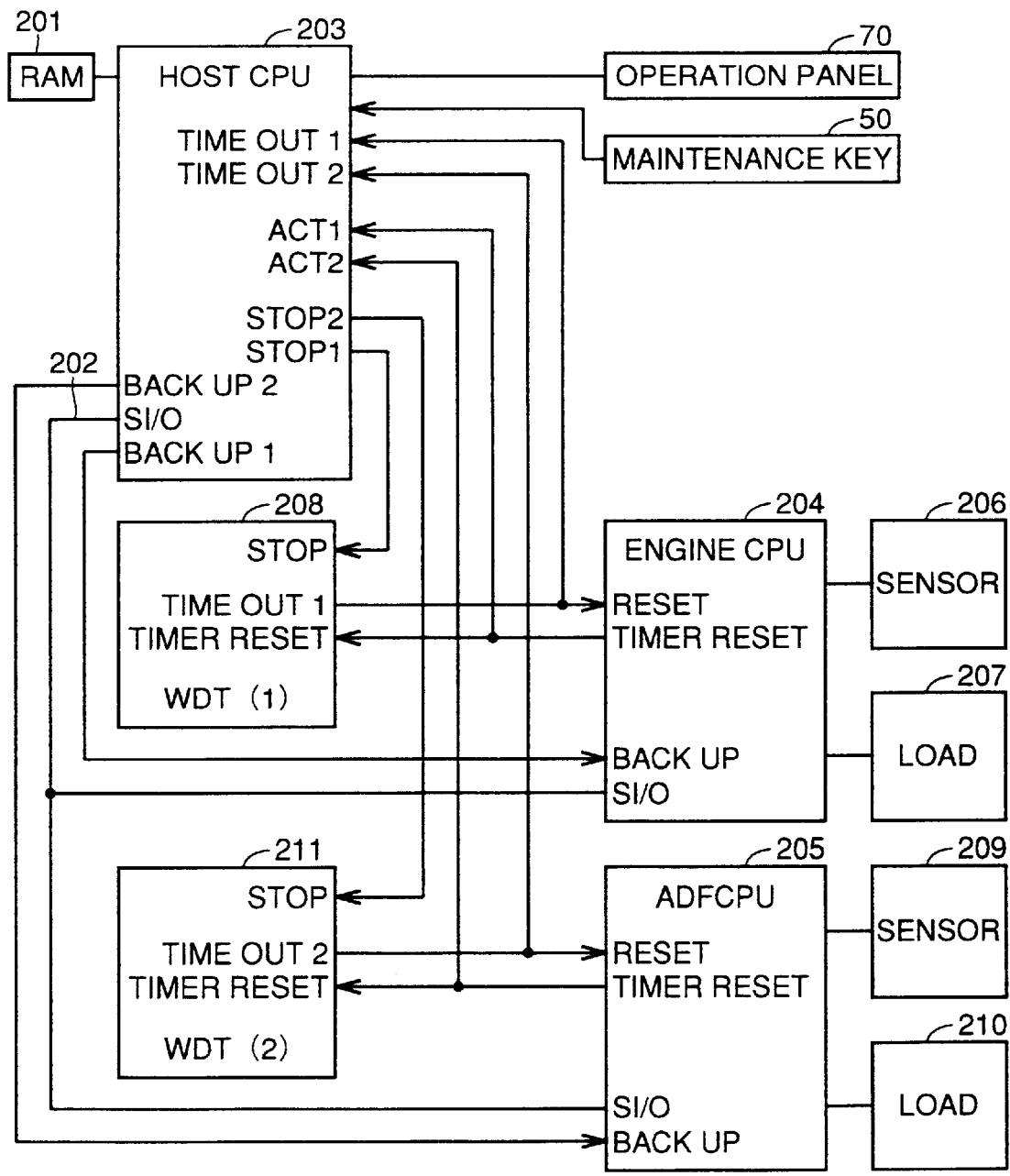
FIG. 3 is a diagram showing a control circuit in the copying machine shown in FIG. 1.

FIG. 3 is a diagram showing a control circuit for copying unit 1 in FIG. 1.

As illustrated in FIG. 3, the control circuit is mainly formed of three central processing units (CPUs), in other words a host CPU 203 for main control, an engine CPU 204 for controlling the operation of copying unit 1, and an ADFCPU 205 for controlling the operation of ADF 30.

Host CPU 203 is connected to the other two CPUs (hereinafter referred to as sub CPUs) by a serial communication line 202, and exchanges various data with the sub CPUs. Host CPU 203 is also connected to the keys on operation panel 70, maintenance key 50, the display device on operation panel 70 and a battery-backed up RAM 201.

Host CPU 203 transmits to the sub CPUs a copying condition input using keys on operation panel 70. Host CPU 203 then instructs the sub CPUs to start copying in response to a print key ON. Once copying is started, host CPU 203 sequentially receives data related to a copying operation from the sub CPUs, determines based on the data how the copying operation proceeds, sheets of paper to be used for copying and the position of a document within the copying machine, then instructs a timing for copying operation to the sub CPU or instructs continuation or termination of a subsequent copying operation. The above copying condition data or data related to the copying operation are timely stored in RAM 201. Host CPU 203 controls display by display panel 72 or LCD 103, makes them display copying conditions and adapt their displays to the progress of the copying operation.

Engine CPU 204 is connected to sensor 206 provided at copying unit 1 and a load 207 such as the above processing devices, engine CPU 204 controls each processing device based on instructions from host CPU 203 and information from the sensors, and makes copying unit 1 form images. Engine CPU 204 is also connected to a watchdog timer (hereinafter referred to as WDT(1)) 208 for monitoring if engine CPU 204 attains an uncontrollable state.

ADFCPU 205 is connected to sensor 209 provided at ADF 30 and load 210 such as a drive motor for driving the conveying roller or the like, controls each portion of ADF 30 based on instructions from host CPU 203 and information from the sensors and makes ADF 30 convey a document. ADFCPU 205 is also connected to a watchdog timer (hereinafter referred to as WDT(2)) 211 for monitoring if ADFCPU 205 attains an uncontrollable state.

Engine CPU 204 sends a timer reset signal to WDT(1) 208, and WDT(1) 208 starts counting time since reception of the timer reset signal. After a prescribed time period from the start of counting time, the time is up. If engine CPU 204 operates normally, a timer reset signal is once again input until the time is up, and therefore WDT(1) 208 is not up and starts counting time again. If the timer reset signal is not input within the prescribed time period, WDT(1) 208 is up and outputs a reset signal to engine CPU 204, determining that the engine CPU 204 has attained an uncontrollable state. Engine CPU 204 is reset in response to the reset signal. With a copying operation in progress, load 207 operating is stopped. Note that WDT(2) 211 for ADFCPU 205 functions the same way as WDT(1) 208.

Host CPU 203 reads out copying condition data such as copying density, copying magnification or copying mode and other necessary data from RAM 201 after the sub CPUs are reset by the watchdog timers, and outputs as back up data of the read out data to the CPU in the uncontrollable state. The CPU in an uncontrollable state receives the backup data from a backup terminal, returns the values of RAMs and registers therein to the values before being reset, and once again sets the copying condition which was set before it is reset. Host CPU 203 determines in which state the copying machine was when the sub CPU has attained the uncontrollable state, and gives instructions as to a following copying operation based on the state.

The timer reset signal output from a sub CPU is also input to the ACT terminal of host CPU 203. The reset signal output from a watchdog timer is also input to the time out terminal of host CPU 203. Host CPU 203 checks if the watchdog timer operates normally based on these signals. Host CPU 203 also determines that the sub CPU is abnormal if the sub CPU repeatedly attains an uncontrollable state, and conducts a processing for cutting off power supply to the sub CPU.

Figure 4:
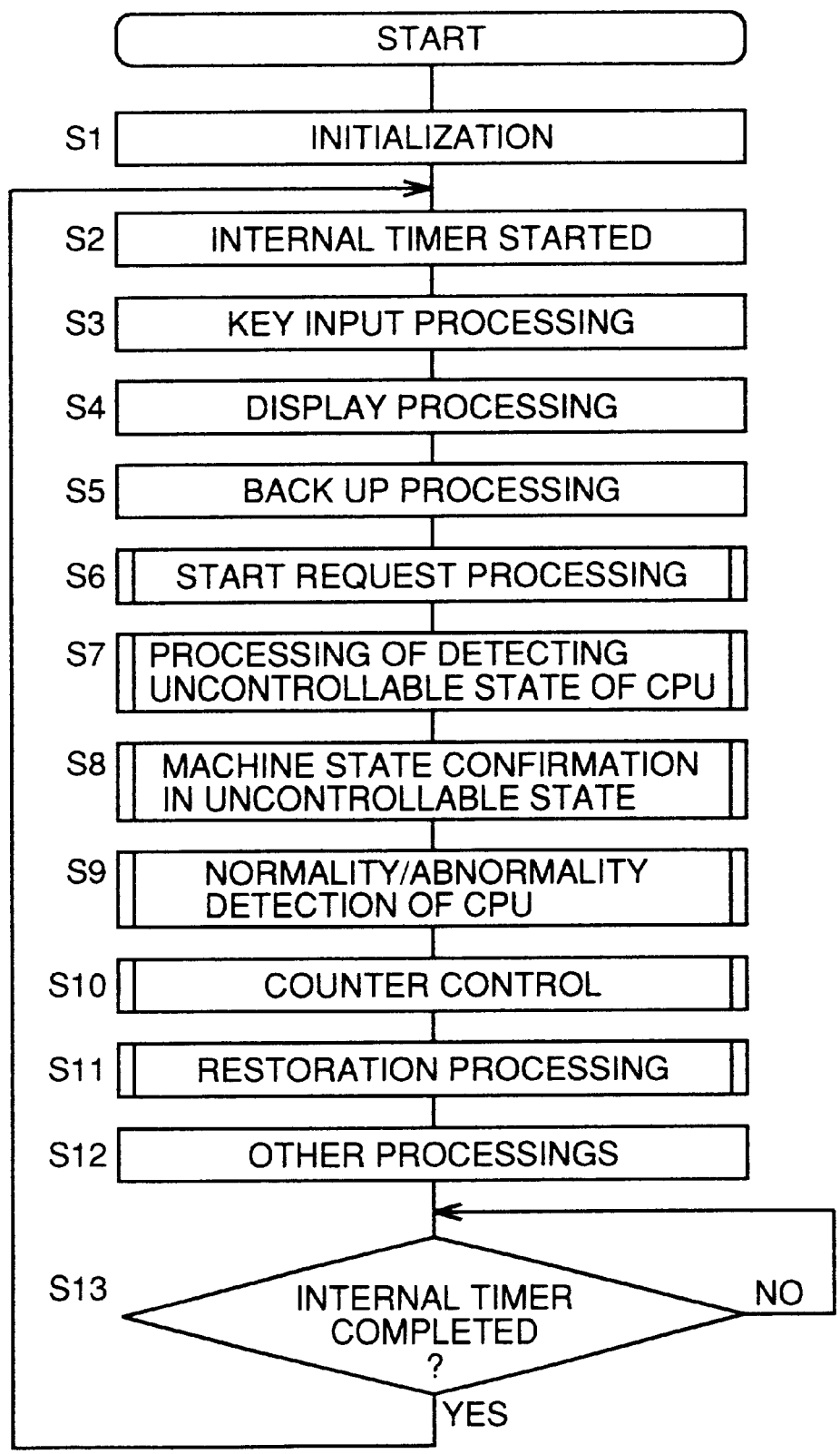
FIG. 4 is a flow chart for use in illustration of a main routine of processing by host CPU 203 in FIG. 3.

FIG. 4 is a flow chart for use in illustration of a main routine of a processing conducted by host CPU 203 in FIG. 3. Before describing the flow chart, the terms "ON edge" and "OFF edge" will be defined. "ON edge" refers to a change of state of a switch, a sensor, a signal etc. from an OFF state to an ON state. "OFF edge" refers to a change of state of a switch, a sensor, a signal etc. from an OFF state to an ON state.

As illustrated in FIG. 4, when the power supply is turned on by operating power supply switch 2, host CPU 203 starts processing and initializes the internal RAM and register or the like in step S1. Then in step S2, the internal timer defining time necessary for one routine is started. Then a key input processing (step S3) for detecting input of each key on operation panel 70 and input of maintenance key 50 is executed, followed sequentially by a display processing (step S4) for controlling display panel 72 and LED 103 on operation panel 70, a backup processing (step S5) for returning a sub CPU reset by a watchdog timer to the state before the sub CPU is reset, a start request processing (step S6) for instructing permission or inhibition of a copying operation to the sub CPU, an uncontrollable state detection processing (step S7) for conducting a processing to detect if the sub CPU attains an uncontrollable state, a state confirmation routine (step S8) for the machine in an uncontrollable state for checking the state of the copying machine with a sub CPU attaining an uncontrollable state, a CPU normality/abnormality determination routine (step S9) for determining if the sub CPU itself is normal, a counter control routine (step S10) for controlling a copying number counter and a total counter, and a restoration processing (S11) for restoring a copying operation after the uncontrollable sub CPU is reset. After conducting other processings in steps S12, the process returns to step S2 after a completion of the internal timer in step S13.

FIG. 5 shows displays on display panel 72 executed in the display processing (step S4 in FIG. 4). As illustrated in FIG. 2, the number of copying, paper sheet size, copying magnification, and copying mode (the normal mode in the case of FIG. 2 is not displayed) are usually shown. Every time copying of one sheet is completed, the remaining number of copying is decremented, and the copying fee is displayed as shown in FIG. 5 at (a) when the copying is completed.

FIG. 5 at (b) shows an example of display when maintenance key 50 is operated. In this case, as shown in the left part of the figure, how many times and how often a watchdog timer is up and the normality/abnormality of the watchdog timer are displayed. Such a display informs the user of the degree of reliability of the operation of the sub CPU. Also as illustrated in the right part of the figure, the value of the total counter counting the total number of copying can be displayed.

FIG. 5 at (c) shows an example of display on display panel 72 when a sub CPU attains an uncontrollable state. As illustrated, the message indicating that the sub CPU is uncontrollable, the kind of the uncontrollable CPU and the position of sheet paper or a document remaining inside the copying machine as displayed. The left part of the figure shows an example of display when copying is interrupted in response to an uncontrollable state of the engine CPU during a copying operation and a paper sheet remains in the vicinity of the paper feeding portion. In this case, removal of the paper sheet in the copying machine by the operator switches the display to the display indicating that the copying operation can be resumed as illustrated in the right part of the figure.

FIG. 5 at (d) is an example f display when a sub CPU is determined abnormal. The left part of the figure corresponds to the case in which engine CPU 204 is determined abnormal, and displays the message indicating that copying is not possible by the abnormality of engine CPU 204. The right part of the figure corresponds to the case when ADFCPU 205 is determined abnormal and displays the message indicating that the ADF cannot be used by the abnormality of ADFCPU205.

Figure 6:
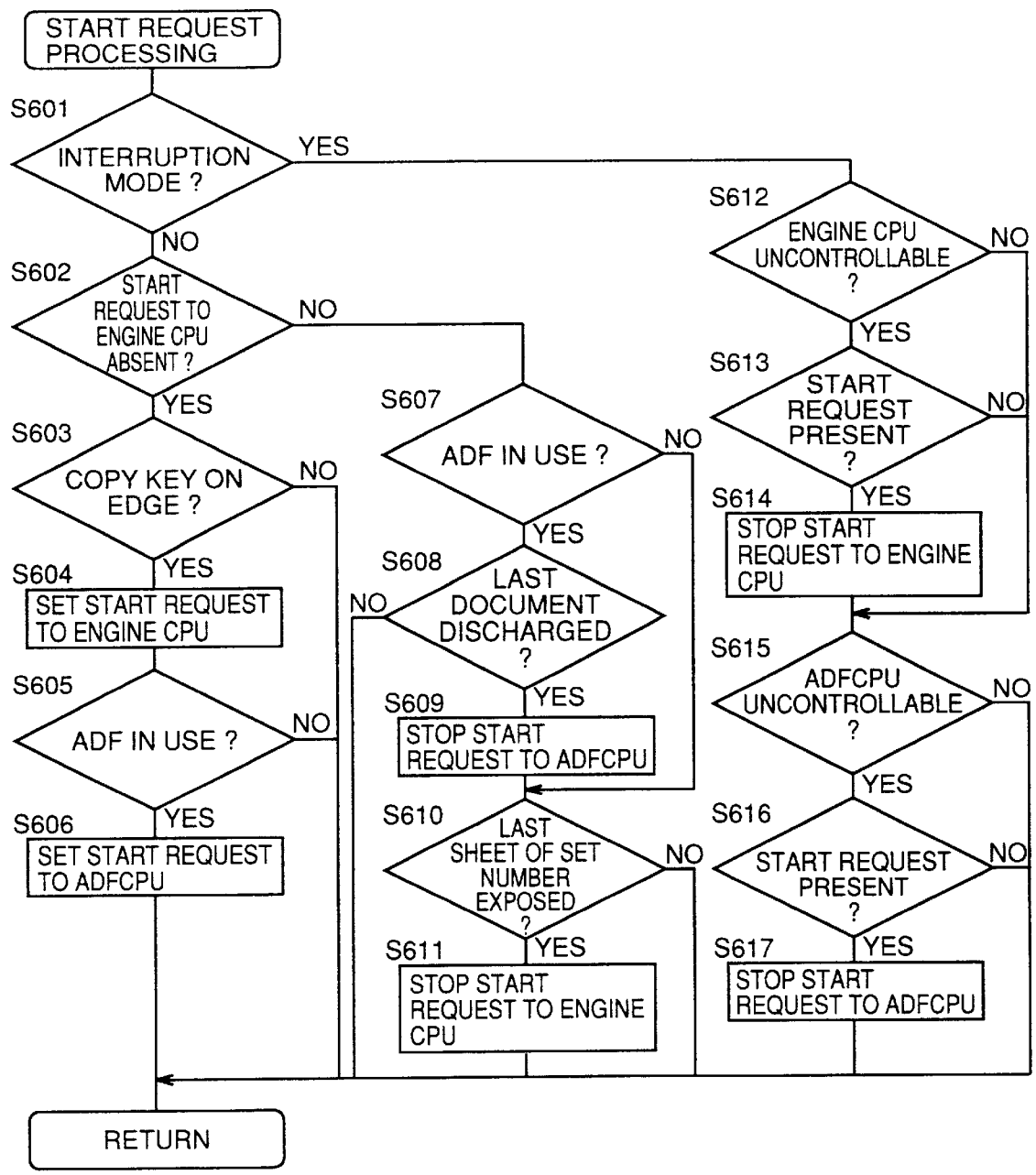
FIG. 6 is a flow chart for use in illustration of the specific content of the start request processing routine in FIG. 4.

FIG. 6 is a flow chart for use in illustration of the specific content of the start request processing (step S6 in FIG. 4).

In this processing, an instruction of permitting copying is given to the sub CPUs. More specifically, in response to a copy key ON, the start request indicating a permission of copying is set to the respective sub CPUs. As will be described later, the sub CPUs control a copying operation based on the presence/absence of the start request from the host CPU.

As illustrated in FIG. 6, it is determined if "interruption mode" is selected in step S601 at present. "Interruption mode" is selected in the machine state confirmation routine (step S8 in FIG. 4) when a sub CPU attains an uncontrollable state, which will be described later in detail. In the case of interruption mode, a processing for stopping the start request to the uncontrollable CPU is conducted (steps S612 to S617).

If it is not in the interruption mode, it is determined whether or not engine CPU 204 undergoes a start request at present (S602). If there is no start request to engine CPU 204, the copying machine is determined to be in a stand-by state, a start request is set to engine CPU 204 in response to a copy key ON, and if ADF 30 is used, a start request is also set to the ADFCPU (steps S603 to S606). If the start request is in progress to engine CPU 204, the start request to ADFCPU 205 is stopped in response to a completion of discharge of the last document set at ADF 30. The start request to engine CPU 204 is stopped in response to a completion of exposure to the last one of the number of copying set input from operation panel 70 (steps S607 to S611).

Figure 7:
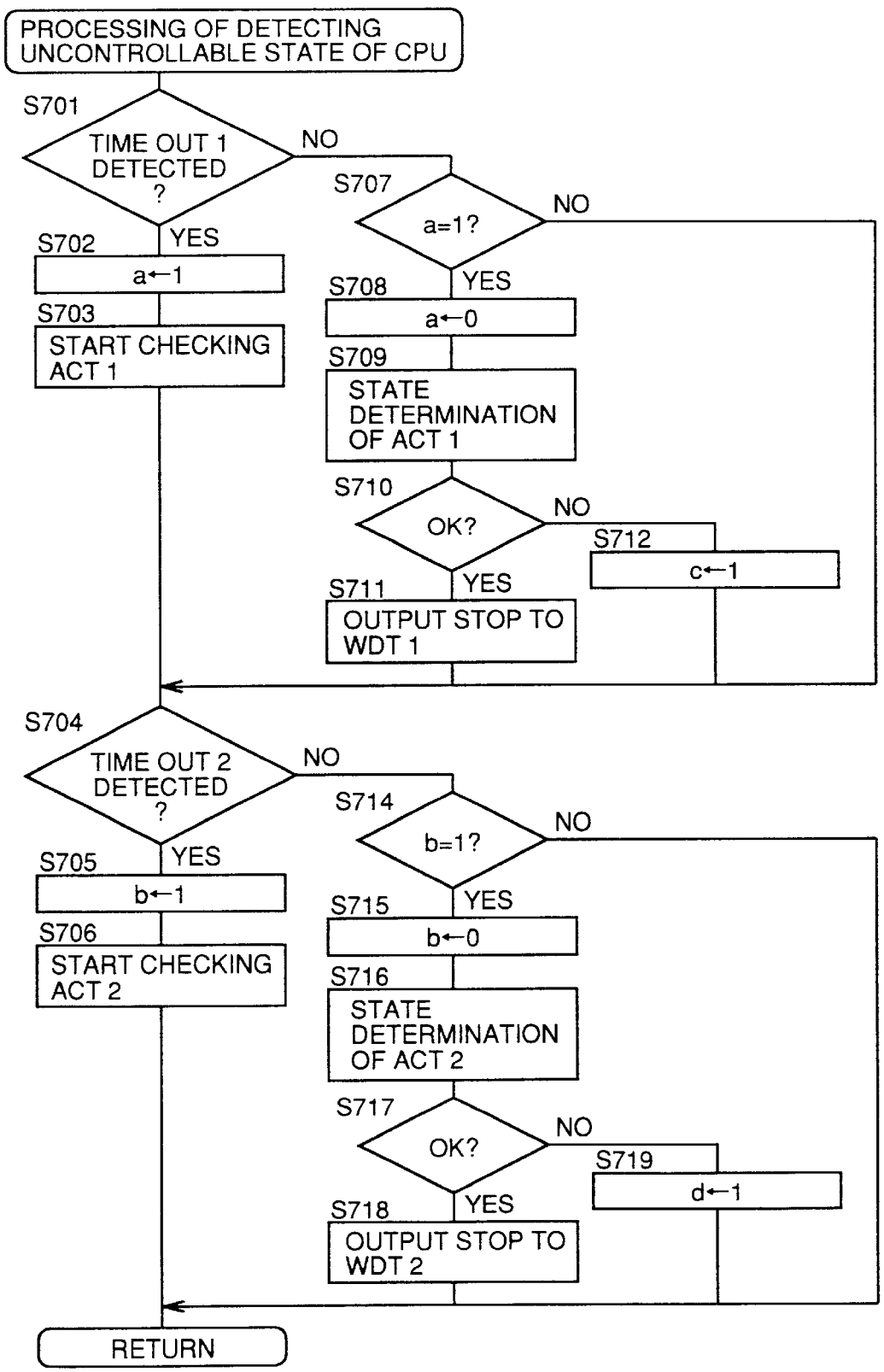
FIG. 7 is a flow chart for use in illustration of the specific content of the uncontrollable state detection processing routine by the CPU in FIG. 4.

FIG. 7 is a flow chart for use in illustration of the specific content of the uncontrollable state detection processing (step S7 in FIG. 4) for a CPU. The processing is based on the principle that it is determined that a sub CPU attains an uncontrollable state when input to the time out terminal is present and a watchdog timer is determined to operate normally.

As illustrated in FIG. 7, if there is input to time out 1 terminal, the value of flag a indicating if WDT1 is up is set to 1, and checking for a signal input through ACT1 terminal is started. Similarly, the value of flag b indicating the time up of WDT2 is set to 1 if there is input to time out 2 terminal, and checking for a signal input to ACT2 terminal is started (steps S701 to S706).

Then, if the value of flag a is 1, WDT1 is determined to be up, the value of flag a is returned to 0 and the signal input state to ACT1 terminal is determined. If there is a signal input at the prescribed intervals to ACT1 terminal, it is considered that despite engine CPU 201 operates normally and outputs a timer reset signal to WDT1 periodically, WDT1 generates a time out signal, and therefore WDT1 is determined to be abnormal. A stop signal is output to WDT1 to stop WDT1 (steps S706 to S711). If there is no signal input at prescribed intervals to ACT1 terminal, it is determined that engine CPU 204 is reset by WDT1, and the value of flag c indicating that the engine CPU 204 has attained an uncontrollable state is set to 1 (step S712).

Similarly, if the value of flag b is 1, WDT2 is determined to be up, and the value of flag b is returned to 0 and the signal input state to ACT2 terminal is determined. If there is a signal input at prescribed intervals to ACT2, it is determined that WDT2 is abnormal and a processing for stopping WDT2 is conducted (steps S714 to S718). If there is no signal input at prescribed intervals to ACT2 terminal, it is determined that ADFCPU 205 has been reset by WDT2, and the value of flag d indicating that ADFCPU 205 is an uncontrollable is set to 1 (step S719).

Note that in this embodiment, although copying is permitted when power supply to the watchdog timer is stopped based on the determination that the watchdog timer is abnormal, the copying may be prohibited instead.

Figure 8:
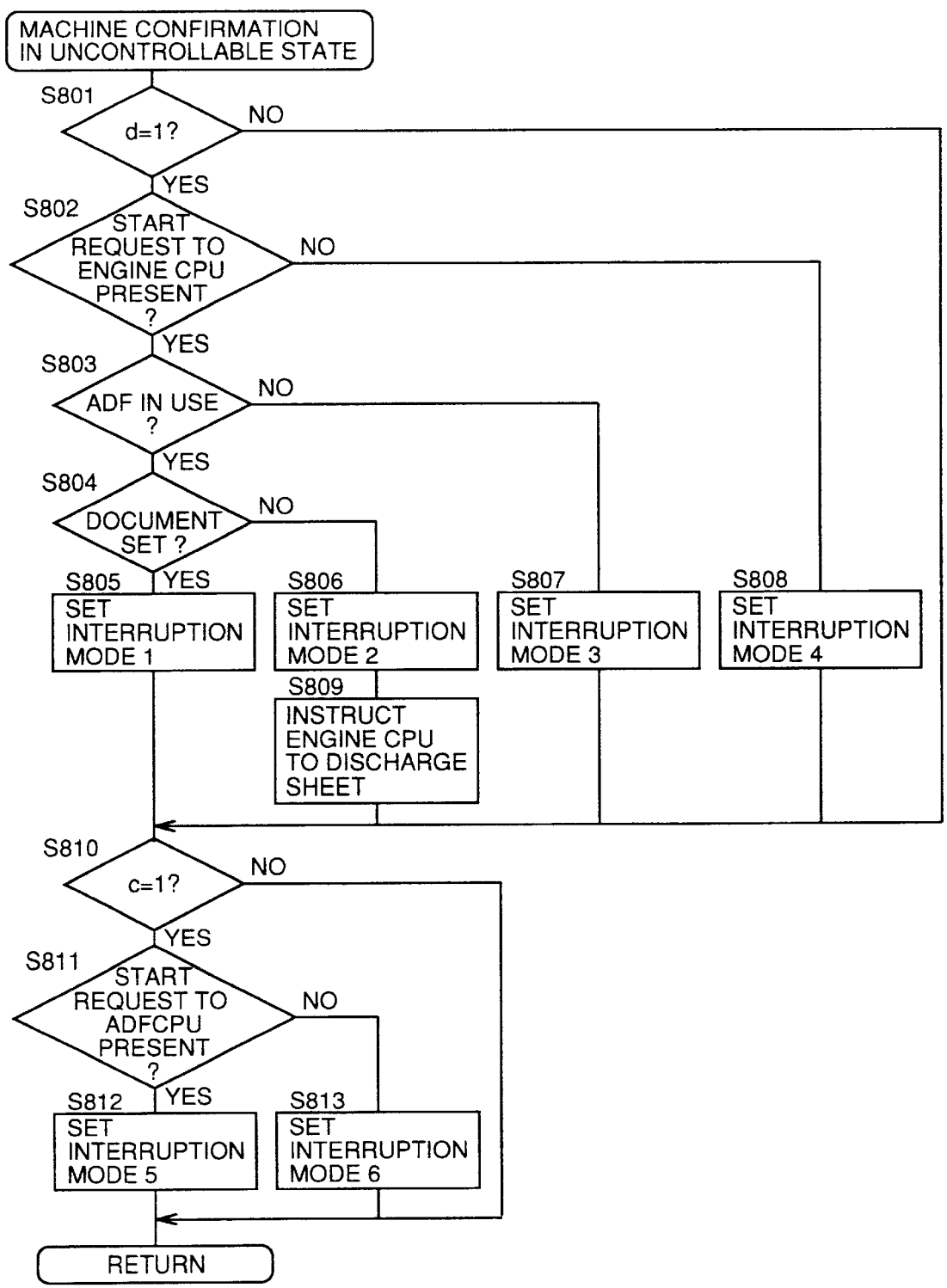
FIG. 8 is a flow chart for use in illustration of the specific content of the state confirmation routine for the machine in an uncontrollable state as illustrated in FIG. 4.

FIG. 8 is a flow chart for use in illustration of the content of details of the machine state confirmation routine in an uncontrollable state (step S8 in FIG. 4). In the subroutine, since when the sub CPU attains an uncontrollable state, the operation of the copying machine is interrupted, a processing is conducted for setting an interruption mode indicating that the CPU has attained an uncontrollable state based on the operation state of the copying machine.

As illustrated in FIG. 8, when the value of flag d is 1, ADFCPU 205 is determined to be in an uncontrollable state, and the following four kinds of interruption modes are set based on if the machine is during a copying operation, a document has been set on document station 19 or the ADF is being used (steps S801 to S808).

Interruption mode 1 . . . ADFCPU 205 becomes uncontrollable during a copying operation and a document has been set on document station 19. In this case, since the document has already been set, the copying operation can be continued.

Interruption mode 2 . . . ADFCPU 205 becomes uncontrollable during a copying operation and a document is not set on document station 19. In this case, the operator must remove the document remaining within ADF 30 in response to a resetting of the ADFCPU 205.

Interruption mode 3 . . . ADFCPU 205 becomes uncontrollable during a copying operation without using ADF 30. In this case, since ADF 30 is irrelevant to the copying operation, the copying operation can be continued.

Interruption mode 4 . . . ADFCPU 205 becomes uncontrollable not during a copying operation.

Note that if interruption mode 2 is set, engine CPU 204 is instructed to forcibly discharge a paper sheet supplied into copying unit 1 and having no image formed thereon, in other words white paper (step S809).

If the value of flag c is 1, it is determined that engine CPU 204 has attained an uncontrollable state, and the following two kinds of interruption modes are set based on if a copying operation is in progress when engine CPU 204 has attained the uncontrollable state (steps S810 to S813).

Interruption mode 5 . . . engine CPU 204 becomes uncontrollable during a copying operation. In this case, the operator must remove sheet paper remaining in copying unit 1 in response to a resetting of engine CPU 204.

Interruption mode 6 . . . engine CPU 204 becomes uncontrollable not during a copying operation.

Based on thus set interruption mode, as will be described later, a processing for restoring the copying operation will be conducted in the restoration processing in step S11. Note that the interruption mode is canceled in the restoration processing (step S11 in FIG. 4) which will be described later.

Figure 9:
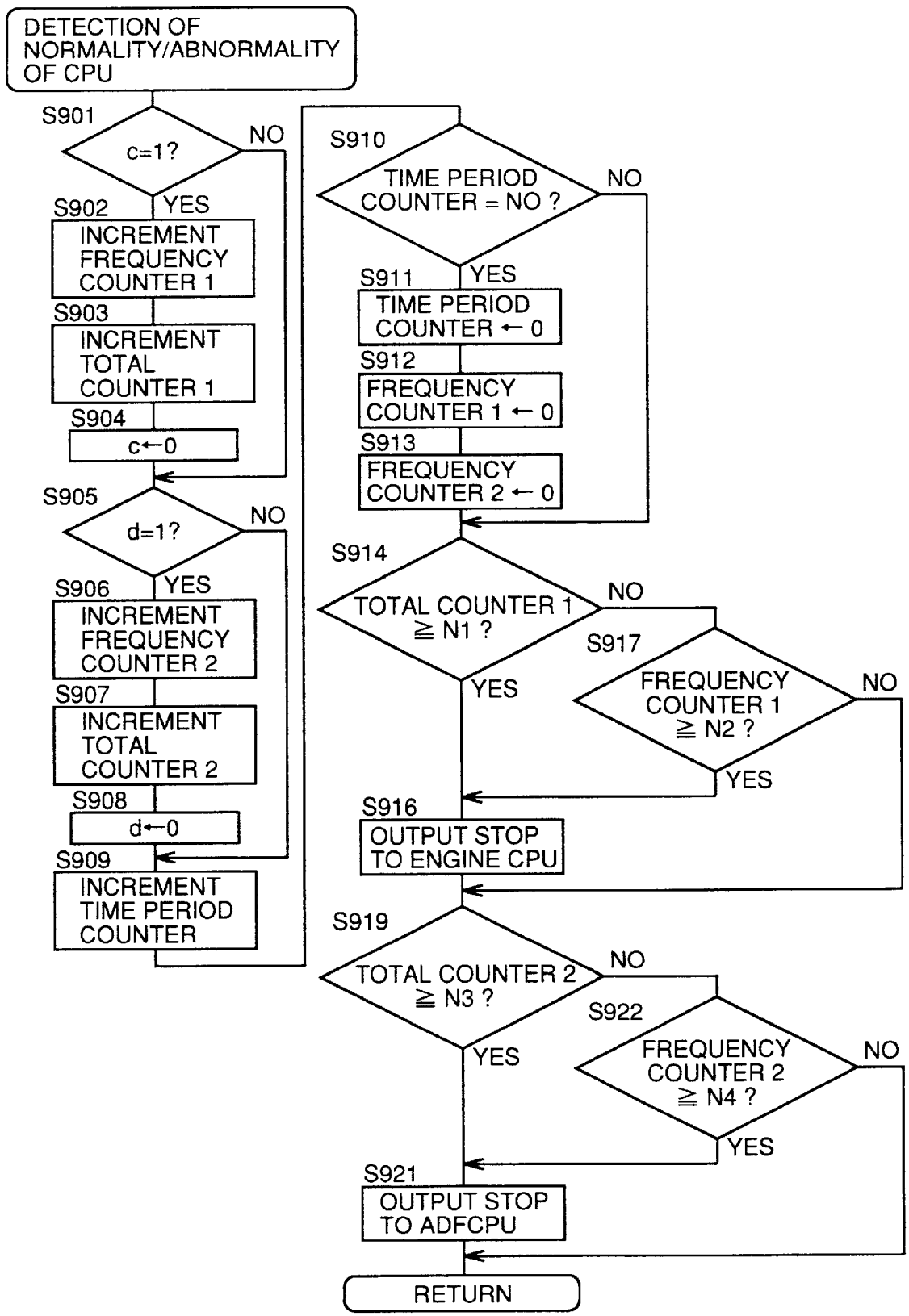
FIG. 9 is a flow chart for use in illustration of the specific content of the normality/abnormality determination routine by the CPU in FIG. 4.

FIG. 9 is a flow chart for use in illustration of the specific content of the normality/abnormality determination processing (step S9 in FIG. 4) for the CPU. The processing is based on the principle that the number of time up is counted for each watchdog timer, and if the total number or the number within a prescribed time period reaches a prescribed value, a sub CPU connected to the watchdog timer is determined abnormal.

As illustrated in FIG. 9, if the value of flag c turns out to be 1 by checking, engine CPU 204 is determined to be in an uncontrollable state, frequency counter 1 indicating the number of time up of WDT1 within a prescribed time period and total number counter 1 indicating the total number of time up of WDT1 are incremented by 1, and the value of flag c is returned to 0 (steps S901 to S904). Then, if the value of flag d turns out to be 1 by checking, ADFCPU 205 is determined uncontrollable, frequency counter 2 indicating the number of time up of WDT2 in a prescribed time period and total counter 2 indicating the total number of time up of WDT2 are incremented, and then the value of flag d turns out to 0 (steps S905 to S908).

Then, the period counter for counting the above-described prescribed time period is incremented, and it is determined if the value reaches a prescribed value NO. If it has reached the value, the period counter, frequency counter 1 and frequency counter 2 are returned to their initial values (steps S909 to S913).

Thereafter, it is determined if the value of total counter 1 has reached a prescribed value N1 or the value of frequency counter 1 has reached a prescribed value N2, and if so, engine CPU 204 is determined to be abnormal and a stop signal is output to engine CPU 204 in order to stop engine CPU 204 (steps S914 to S917). If the value of total counter 2 has reached a prescribed value N3 or the value of frequency counter 2 has reached a prescribed value N4, ADFCPU 205 is determined abnormal, and a stop signal is output to ADFCPU 205 in order to stop ADFCPU 205 (steps S919 to S922).

Note that stopping ADFCPU 205 does not hinder a copying operation without using ADF30, and therefore a copying operation can be conducted by manually setting a document. In this embodiment, as illustrated in the right part of FIG. 5 at (d), it is displayed that ADFCPU 205 is abnormal after power supply to ADFCPU 205 is stopped.

The number and frequency of time up of a watchdog timer are calculated based on the above-described total counter, frequency counter and period counter, and displayed on the display panel as illustrated in the left part of FIG. 5 at (b).

Figure 10:
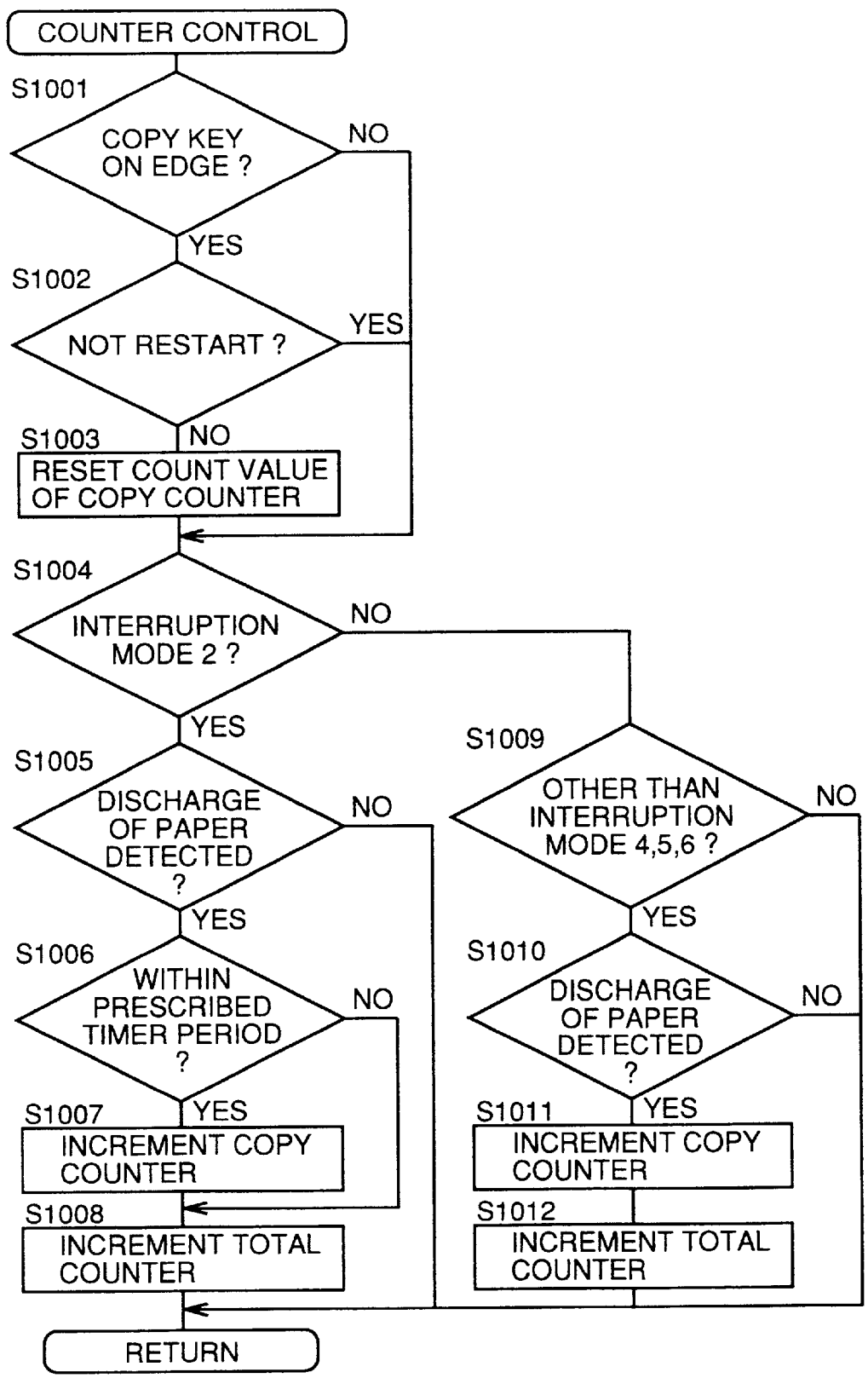
FIG. 10 is a flow chart for use in illustration of the specific content of the counter control routine in FIG. 4.

FIG. 10 is a flow chart for use in illustration of the specific content of the counter control routine (step S10 in FIG. 4).

As illustrated in FIG. 10, in response to a detection of a copy key ON edge, it is determined if the present copy start is a restart from an interruption due to an uncontrollable of a sub CPU. If it is not such a restart, the value of the copy counter based on which a copying fee is calculated is returned to 0. If it is a restart from an interruption mode, the count value is maintained (steps S1001 to S1003).

The counting operation of each counter is controlled based on a mode presently set.

If ADFCPU 205 becomes uncontrollable during a copying operation, no document is set on document station 19 (interruption mode 2), and a discharge of paper within time required for the tip end of the paper reaches an opposing position to sensor SE5 from the transfer position, it is determined that sheets having images formed thereon been discharged, and the copy counter is incremented. If such a detection of discharge of sheets is after the above-described prescribed time period, it is determined that a sheet fed to timing roller 42 is forcibly discharged with no image formed thereon in response to an instruction from host CPU 203, and the copy counter is not incremented (steps S1004 to S1007). In any of the cases, the value of the total counter is incremented in response to a detection of discharge of a sheet (step S1008).

When ADFCPU 205 becomes uncontrollable during a copying operation and a document is set on document station 19 (interruption mode 1), when ADFCPU 205 becomes uncontrollable during a copying operation without using ADF 30 (interruption mode 3) or when an interruption mode is not set, the image forming operation of the copying unit is not hindered, and therefore the copy counter and the total counter are incremented every time a discharge of paper is detected. When engine CPU 204 becomes uncontrollable during a copying operation (interruption mode 5), or when a sub CPU becomes uncontrollable not during a copying operation (interruption mode 4, 6), since paper is not discharged, the values of counters are maintained as they are (steps S1009 to S1012).

As described above, the counting operation of both counters is controlled. A copying fee is calculated based on the value of the copy counter, and displayed on display panel 72 as illustrated in FIG. 5 at (a) after the copying is completed. The value of the total counter is displayed in response to the operation of maintenance key 50.

Figure 11:
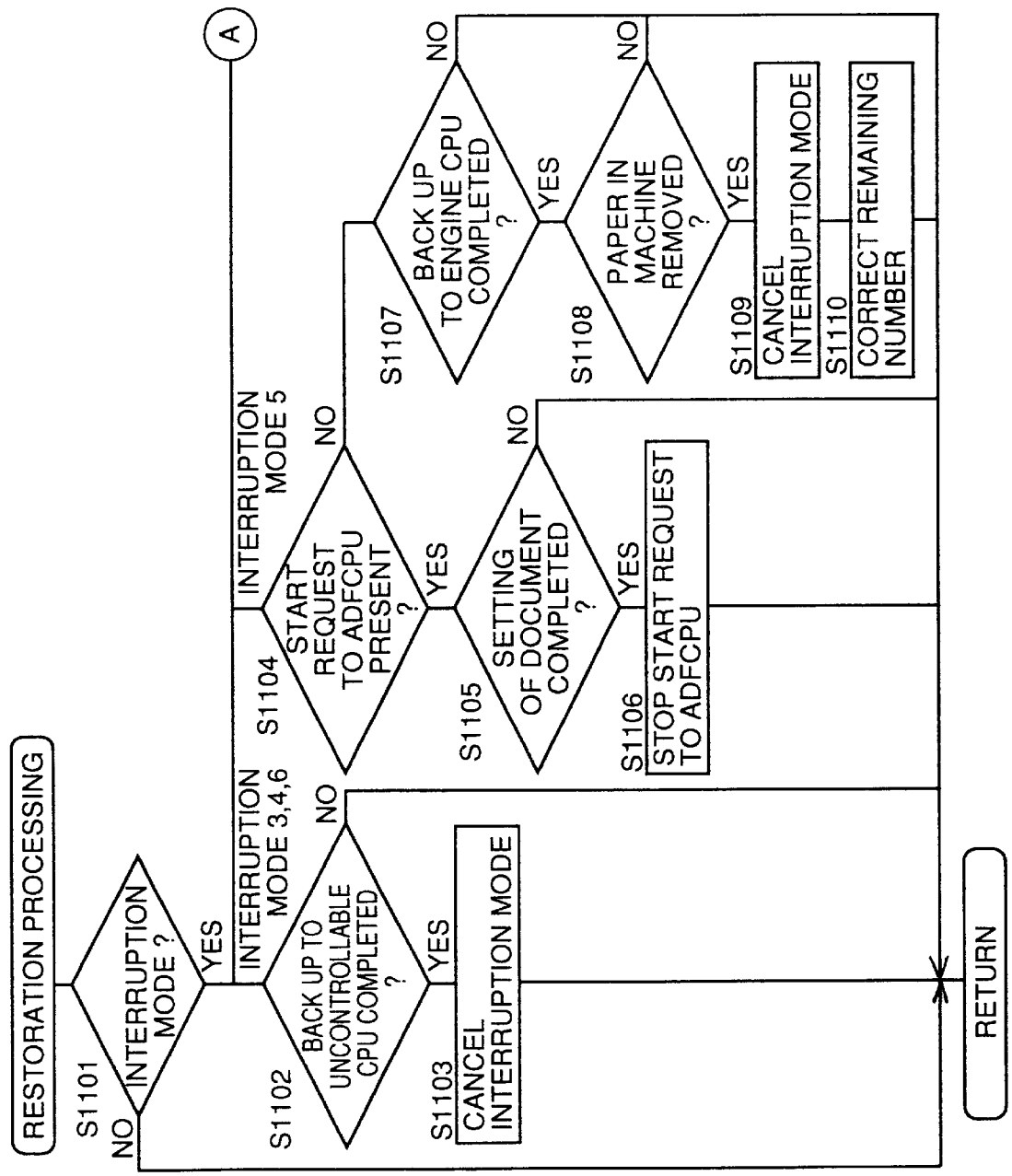
FIG. 11 is a part of a flow chart for use in illustration of the specific content of the restoration processing routine in FIG. 4.
Figure 12:
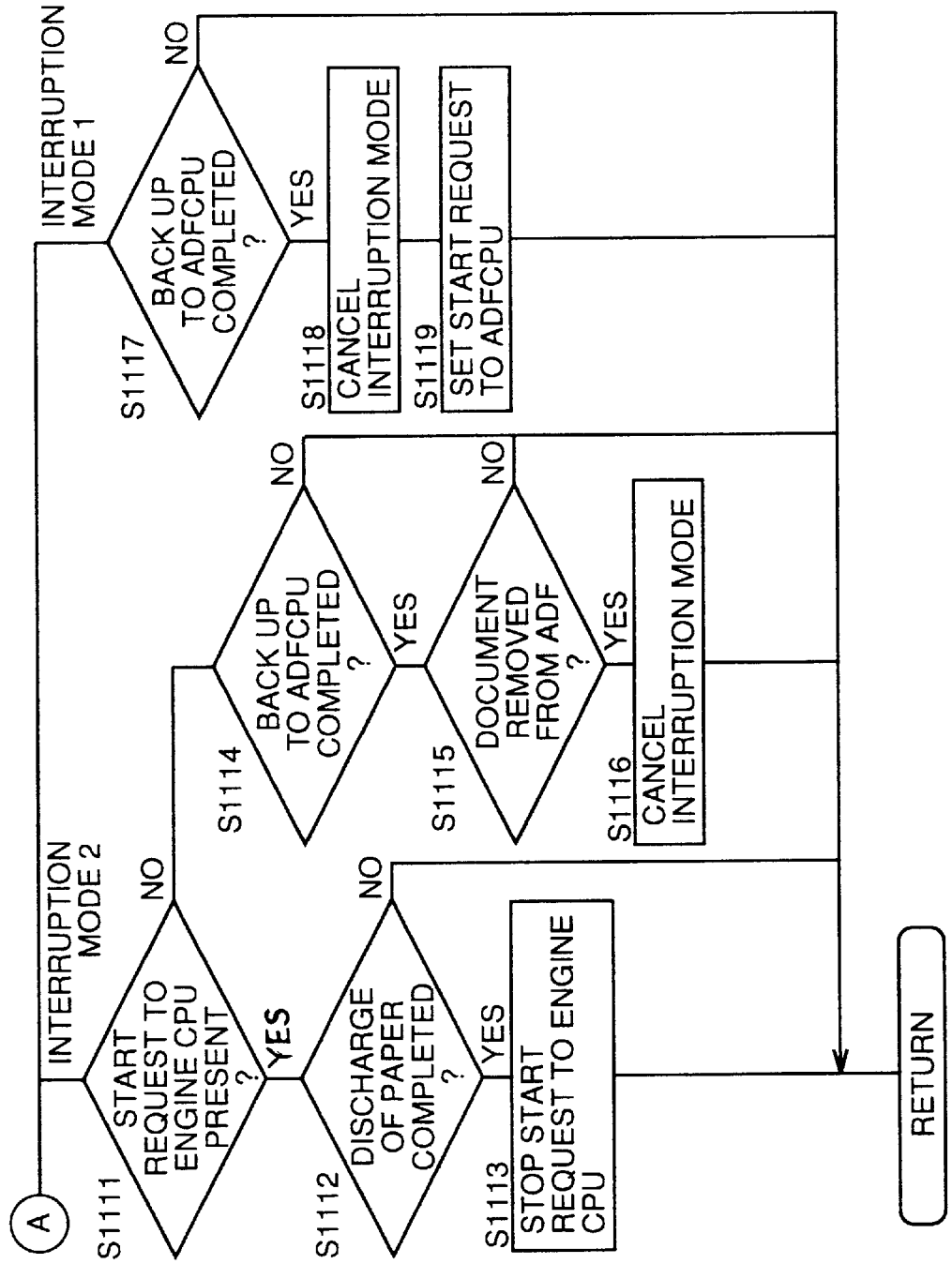
FIG. 12 is the other part of the flow chart for use in illustration of the specific content of the restoration processing routine in FIG. 4.

FIGS. 11 and 12 are flow charts showing the specific content of the restoration processing (step S11 in FIG. 4). In this processing, a processing for resuming the copying operation is conducted in response to an interruption mode set in the machine state confirmation routine in an uncontrollable state.

Each processing by the host CPU and the sub CPUs in response to the interruption modes will be described before describing the flow charts.

Interruption Mode 1

(ADFCPU becomes uncontrollable during a copying operation and a document has been set on document station 19)

Processing by Host CPU

Interruption mode 1 is set in step S805 in FIG. 8, base on determination of YES in the processing of step S601 and YES in steps S615 and S617 in FIG. 6, a start request to ADFCPU 205 is stopped, and an instruction for interrupting feeding of a further document after occurrence of an uncontrollable state is output to ADFCPU 205. Then, backup of information indicating the state of ADFCPU 205 is conducted in the processing of step S1117 in FIG. 12, the interruption mode is canceled in step S1118, a start request is sent to ADFCPU 205 in step S1119, and resuming of feeding of the next document is instructed.

Processing by ADFCPU

Figure 21:
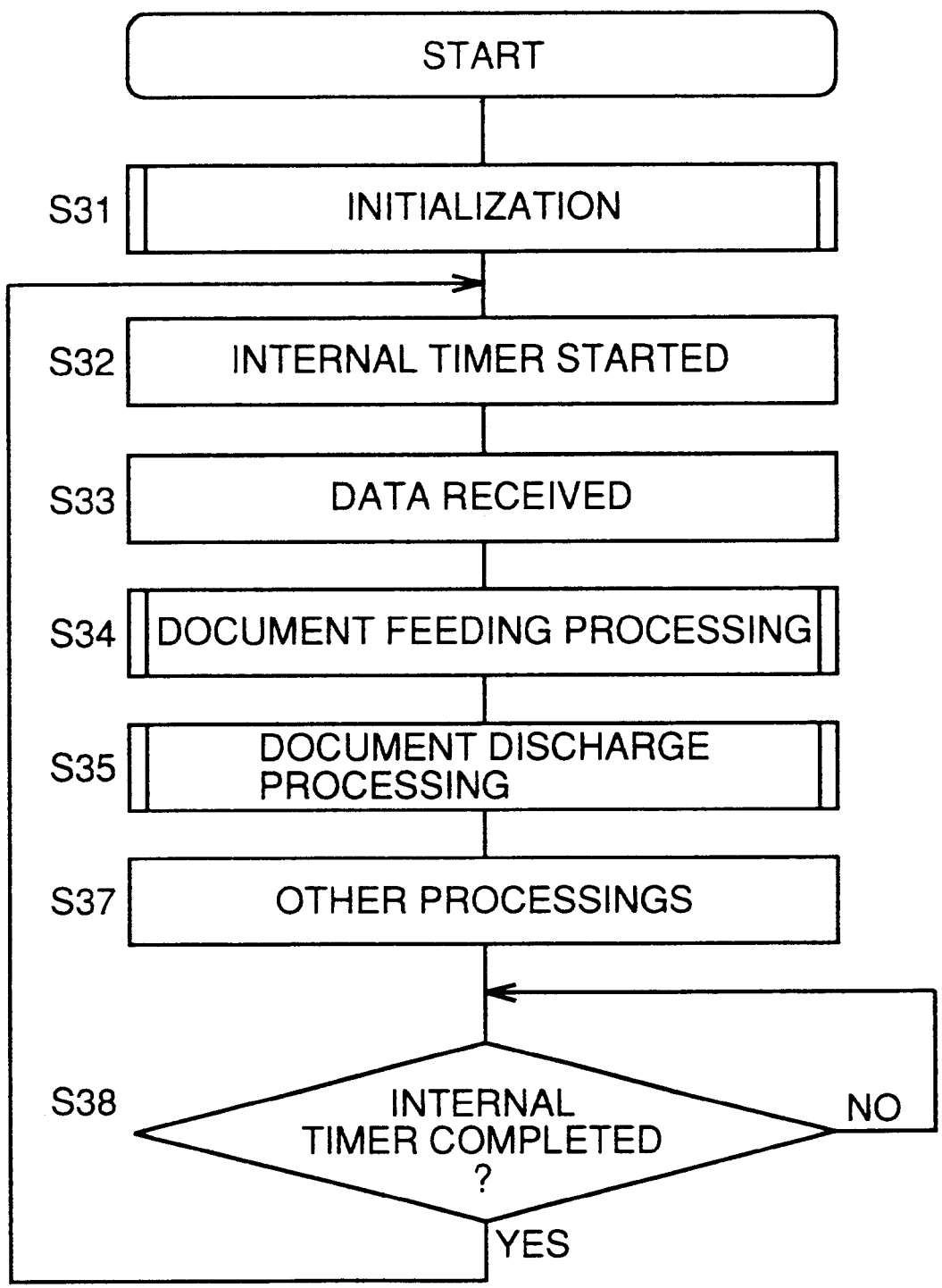
FIG. 21 is a flow chart for use in illustration of a main routine of processing by the ADFCPU in FIG. 3.

The uncontrollable ADFCPU 205 restarts in response to a time up of WDT(2) 211 and is initialized based on the backup information in initialization in step S31 in FIG. 21. Then, a start request is output in the processing of step S1119 from host CPU 203, ADFCPU 205 continues the processing from the point at which it became uncontrollable, and continues to execute the processing of conveying the document. Thus, the entire document is copied apparently without an interruption of the machine operation due to the uncontrollable state.

Interruption Mode 2

(The ADFCPU becomes uncontrollable during a copying operation and no document is set on document station 19)

Processing by the Host CPU

With interruption mode 2 set in step S806 in FIG. 8, the processing of step S601 in FIG. 6 is determined to be YES, and steps S615 and 617 are determined to be YES, a start request to ADFCPU 205 is stopped, and an instruction of interrupting feeding of a new document after the occurrence of an uncontrollable state is output to ADFCPU 205. If a copying operation is started and a copy paper sheet is fed in the processing of step S1111 in FIG. 12 (YES in step S1111), it is confirmed that the fed copying paper sheet is discharged, and then a start request to engine CPU 204 is stopped in step S1113, in order to stop feeding the next copy paper sheet.

Further in step S1113, a start request to engine CPU 204 is stopped, then information indicating the state of ADFCPU 205 is backed up by the processing of step S1114, and the interruption mode in step S1116 is canceled if it is determined that the operator has removed a document which has stopped and remains in ADF 30.

Processing by ADFCPU

The uncontrollable ADFCPU 205 restarts in response to a time up of WDT(2) 211, and is initialized based on the backup information in an initialization in step S31 in FIG. 21. Since a start request is not output from host CPU 203 at the time, ADFCPU 205 attains a stand-by state, copy key 71 is turned ON, and a document feeding operation is stopped until a start request from host CPU 203 is sent.

Interruption Mode 3

(The ADFCPU attains an uncontrollable state during a copying operation of a manually placed document without using ADF 30)

Processing by Host CPU

With interruption mode 3 set in step S807 in FIG. 8, information indicating the state of ADFCPU 205 is backed up in the processing of step S1102 in FIG. 11, and the interruption mode is canceled in step S1103.

Processing by ADFCPU

The uncontrollable ADFCPU 205 restarts in response to a time up of WDT(2) 211, and is initialized based on the backup information in an initialization in step S31 in FIG. 21. The copying operation by manually placing the document without using ADF 30 can be executed without any hindrance.

Interruption Mode 4

(The ADFCPU attains an uncontrollable state not during a copying operation)

Processing by Host CPU

With interruption mode 4 set in step S807 in FIG. 8, information indicating the state of ADFCPU 205 is backed up in the processing of step S1102 in FIG. 11, and the interruption mode is canceled in step S1103.

Processing by ADFCPU

The uncontrollable ADFCPU 205 restarts in response to a time up of WDT(2) 211, and is initialized based on the backup information in an initialization in step S31 in FIG. 21. Therefore, a stand-by state is reached in which a copying operation can be executed any time.

Interruption Mode 5

(The engine CPU becomes uncontrollable during a copying operation).

Processing by Host CPU

With interruption mode 5 set in step S812 in FIG. 8, the processing of step S601 in FIG. 6 is determined to be YES, steps S612 and S613 are determined to be YES, then a start request to engine CPU 204 is stopped, and an instruction of interrupting a copying operation after the occurrence of the uncontrollable state is output to engine CPU 204. Further in the processing of step S1141 in FIG. 12, if the ADF has started conveying a document to document station 19 (YES in step S1141), after confirming that the document has been set to document station 19 (step S1105), a start request to ADFCPU 205 is stopped in S1106 in order to stop feeding of the next document.

Further in step S1107, information indicating the state of engine CPU 204 is backed up, and the interruption mode is canceled in the processing of step S1109 upon determining that the operator has removed the copying paper sheet remaining in the copying machine in step S1108.

Processing by Engine CPU

Figure 15:
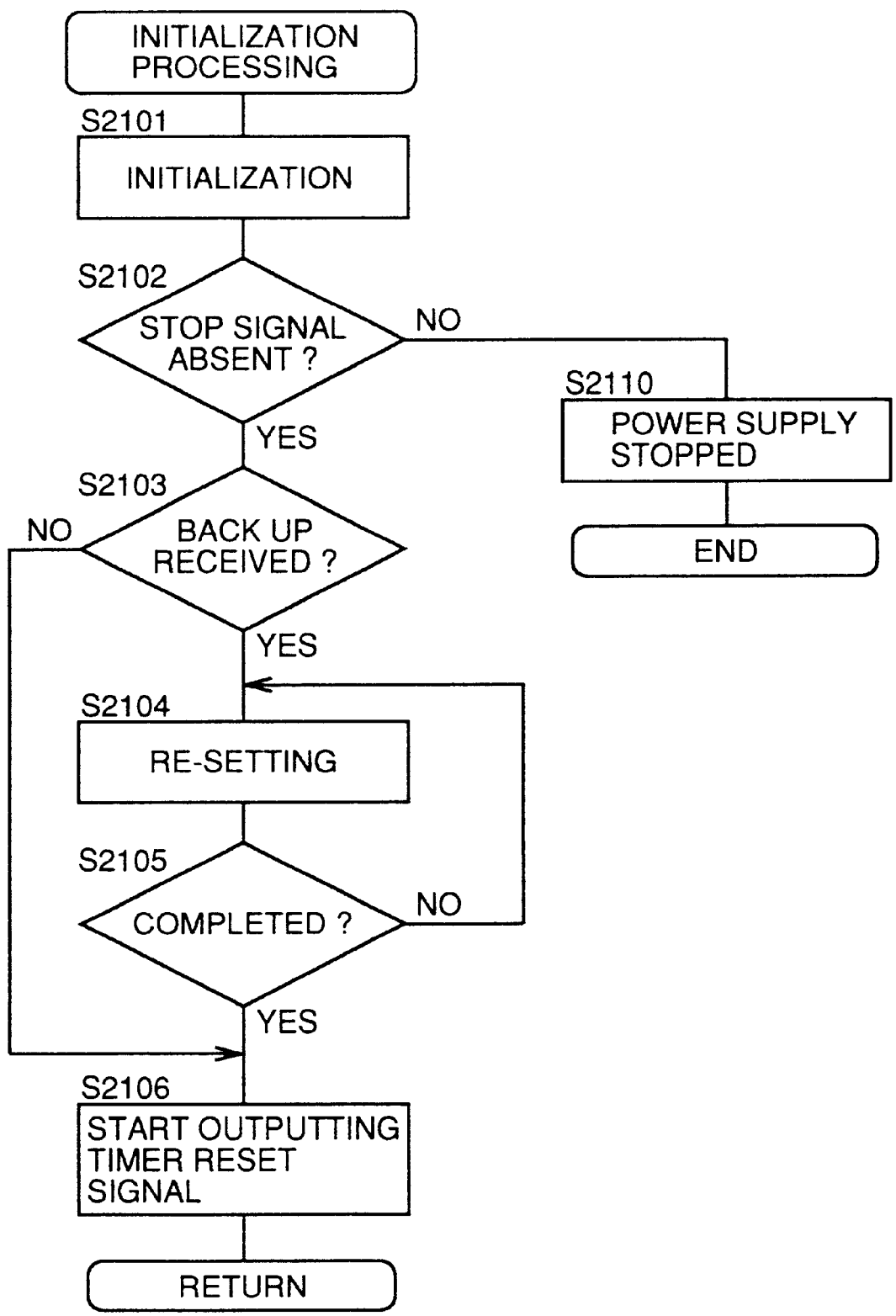
FIG. 15 is a flow chart for use in illustration of the specific content of the initialization processing routine in FIG. 14.

The uncontrollable engine CPU 204 restarts in response to a time up of WDT(1) 208, and is initialized based on the backup information in a re-setting in step S2104 in FIG. 15. Since a start request is not output from the host CPU at the time, the engine CPU attains a stand-by state, copy key 71 is turned ON, and a copying operation is stopped until a start request is sent from the host CPU.

Interruption Mode 6

(The engine CPU becomes uncontrollable not during a copying operation)

Processing by Host CPU

With interruption mode 6 set in step S813 in FIG. 8, in the processing of step S1102 in FIG. 11, information indicating the state of engine CPU 204 is backed up, and the interruption mode is canceled in step S1103.

Processing by ADFCPU

The uncontrollable engine CPU 204 restarts in response to a time up of WDT(1) 208, and is initialized based on the backup information in the re-resetting in step S2104 in FIG. 15. Accordingly, a stand-by state is reached in which a copying operation can be executed anytime.

Referring back to FIG. 11, it is determined if an interruption mode is set, and if an interruption mode is not set, the process immediately returns (step S1101).

If interruption mode 3, 4 or 6 is set, in other words if ADFCPU 205 becomes uncontrollable during a copying operation using ADF 30 (interruption mode 3), or a sub CPU becomes uncontrollable not during a copying operation (interruption mode 4, 6), the interruption mode is canceled when a backup to the uncontrollable sub CPU is completed (steps S1102 to S1103).

If interruption mode 5 is set, in other words if engine CPU 204 becomes uncontrollable during a copying operation, a start request to ADF CPU 205 is continued, and the processing is continued until a document is completely set to document station 19. After the setting of the document is completed, the start request to ADFCPU 205 is stopped (steps S1104 to S1106). Thereafter, a backup for engine CPU 204 by host CPU 203 is completed and paper within copying unit 1 has been removed, the interruption mode is canceled and the remaining number of copying is corrected. More specifically, since the remaining number of copying displayed on display panel 72 is decremented when exposure of a document is completed, and therefore, if a paper sheet onto which an image having been exposed to light immediately before engine CPU 204 became uncontrollable is to be transferred has not been completely discharged, the remaining number is incremented (steps S1107 to S1110).

As illustrated in FIG. 12, if interruption mode 2 is set, in other words, if ADFCPU 205 becomes uncontrollable during a copying operation and no document is set on document station 19, the start request to engine CPU 204 is continued, and the processing is continued until all paper sheets within copying unit 1 are discharged. After completion of discharge of the paper, the start request to engine CPU 204 is stopped (steps S1111 to S1113). Thereafter, when a backup for engine CPU 204 by host CPU 203 is completed and the operator has removed a document within ADF 30, the interruption mode is canceled (steps S1114 to S1116).

If interruption mode 1 is set, in other words if ADFCPU 205 becomes uncontrollable during a copying operation and a document has been set on document station 19, the interruption mode is canceled when a backup for ADFCPU 205 by host CPU 203 is completed. Then, in order to automatically continue the copying operation, a start request is once again set to ADFCPU 205 (steps S1117 to S1119).

The interruption mode thus set in the machine state confirmation routine in an uncontrollable state in step S8 is canceled in the restoration processing of step S11 along with the restoration of the copying operation.

Figure 13:
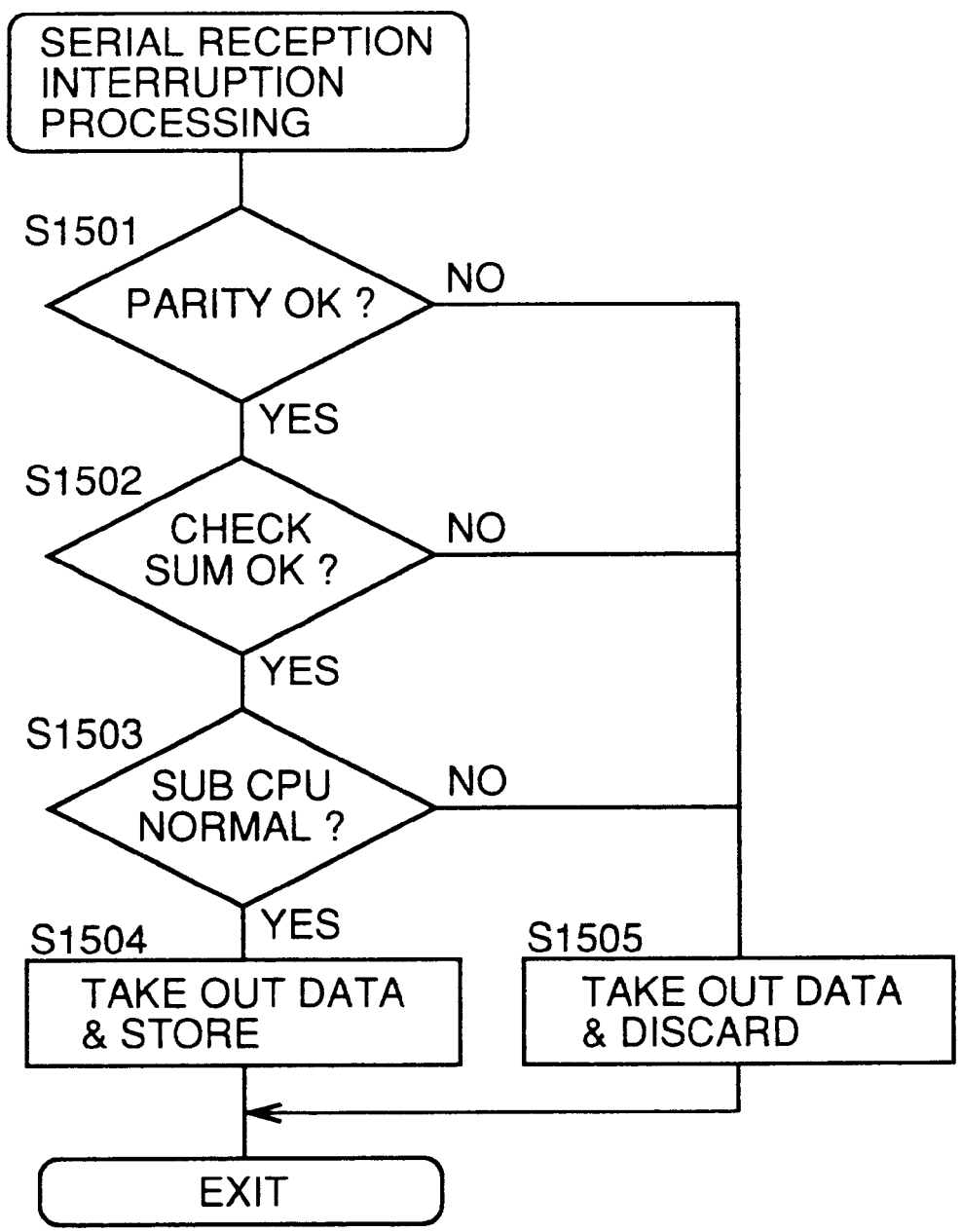
FIG. 13 is a flow chart showing a detail of a serial reception interruption processing by the copying machine in FIG. 1.

FIG. 13 is a flow chart for use in illustration of a processing when host CPU 203 receives data from a sub CPU in FIG. 3. The sub CPU outputs various data such as output change in a sensor in an arbitrary timing, and host CPU 203 accepts the data into a buffer therein. When the data is accepted at the buffer, an interruption routine shown in FIG. 13 is activated. In the processing, checking for parity, checking for check sum and checking if the sub CPU becomes uncontrollable are conducted, and only when all the results of checking are normal, the data is determined normal and read out from the buffer and stored in RAM 201 (steps S1501–S1504). If any of the results is determined not normal, the data in the buffer is discarded (step S1505).

The processing by engine CPU 204 will be now described in detail. By operating power supply switch 2, engine CPU 204 is supplied with power as is the case with host CPU 203, and engine CPU 204 starts processing. If, however, host CPU 203 determines that engine CPU 204 is abnormal, power is not supplied to engine CPU 204.

Figure 14:
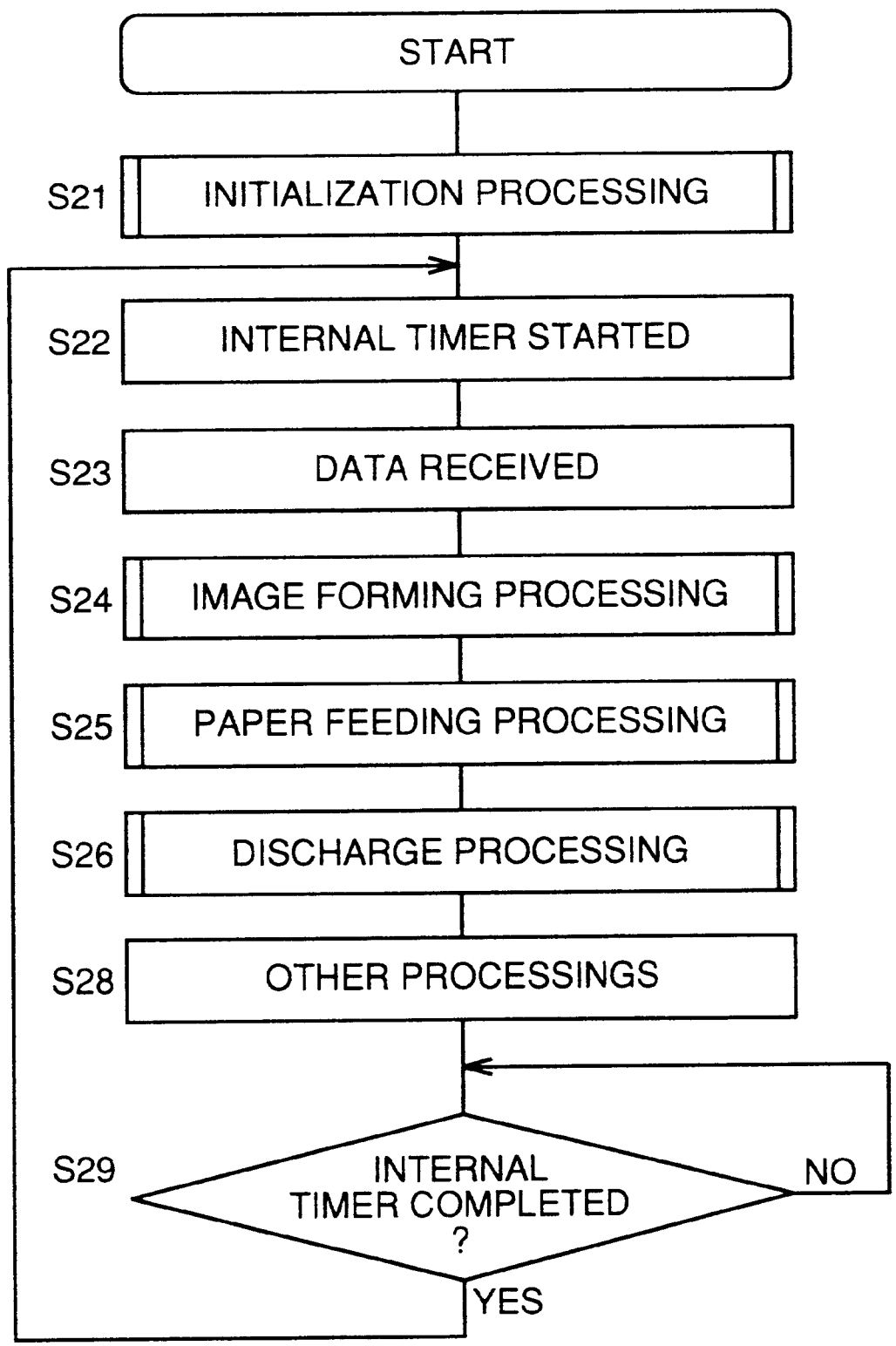
FIG. 14 is a flow chart for use in illustration of a main routine of processing by the engine CPU in FIG. 3.

FIG. 14 is a flow chart for use in illustration of a main routine of processing by engine CPU 204.

As illustrated in FIG. 14, engine CPU 204 starts processing in response to an initiation of power supply by turning ON power supply switch or in response to a reset signal input from a watchdog timer, and conducts an initialization processing such as setting for initial conditions in step S21. Then, in step S22, the internal timer defining time required for one routine is started. Then, sequentially, a data reception processing for communication with the main CPU (step S23), an image forming processing for image formation (step S24), a paper feeding conveying processing for feeding paper sheets into copying unit 1 from paper feeding cassette 40 (step S25), a discharge processing for discharging a paper sheet from copying unit 1 (step S26) are conducted. In step S28, the process returns to step S22 when the internal timer is completed.

FIG. 15 is a flow chart for use in illustration of the specific content of an initialization processing (step S21 in FIG. 14) by engine CPU 204. As illustrated in FIG. 15, the internal RAM is cleared to initialize the values of flags and statuses, then the devices are set based on standard copying conditions. In the case of a restarting in response to an uncontrollable state attained by engine CPU 204, any load during operation is stopped and returned to its initial position (step 2101).

Then in step S2102, it is determined if a stop signal is sent from host CPU 203. If the stop signal is sent, power supply to its load and engine CPU 204 itself is cut off, and the processing is completed (step S2110).

If the stop signal is not sent, in step S2103, it is determined if a backup signal is sent from host CPU 203. If the backup signal is sent, based on the determination that it is an initialization in response to an uncontrollable state, the internal RAM, register or the like in the engine CPU are returned to their states before the initialization in response to the signal, and each device is re-set accordingly (step S2104).

If the backup signal is not sent, or the backup has been completed, output of a timer reset signal is started at prescribed intervals to host CPU 203 and WDT(1) 208 (steps S2103, S2105 to S2106). The timer reset signal is output by an interruption processing at prescribed intervals.

Figure 16:
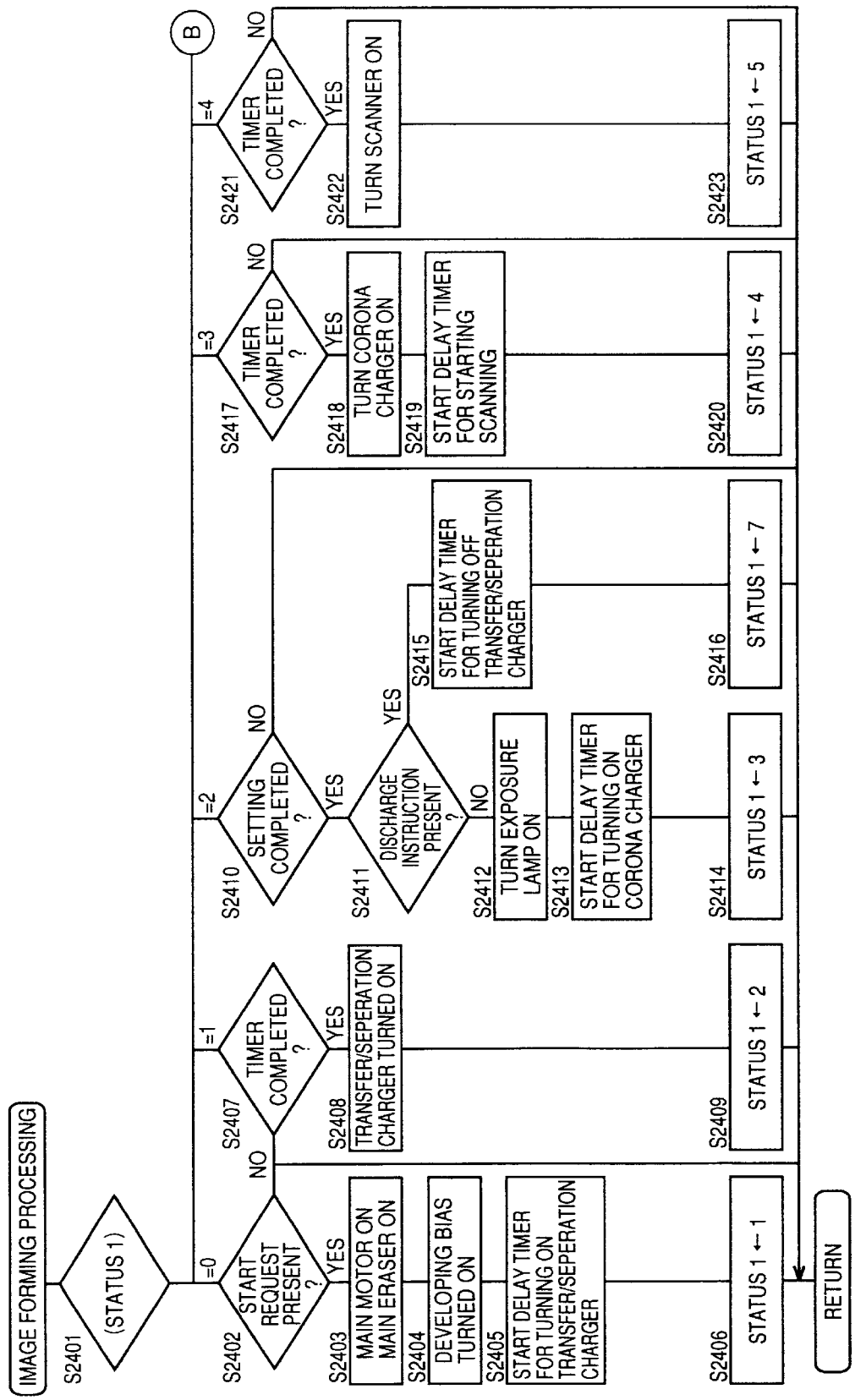
FIG. 16 is a part of a flow chart for use in illustration of the specific content of the image forming processing routine in FIG. 14.
Figure 17:
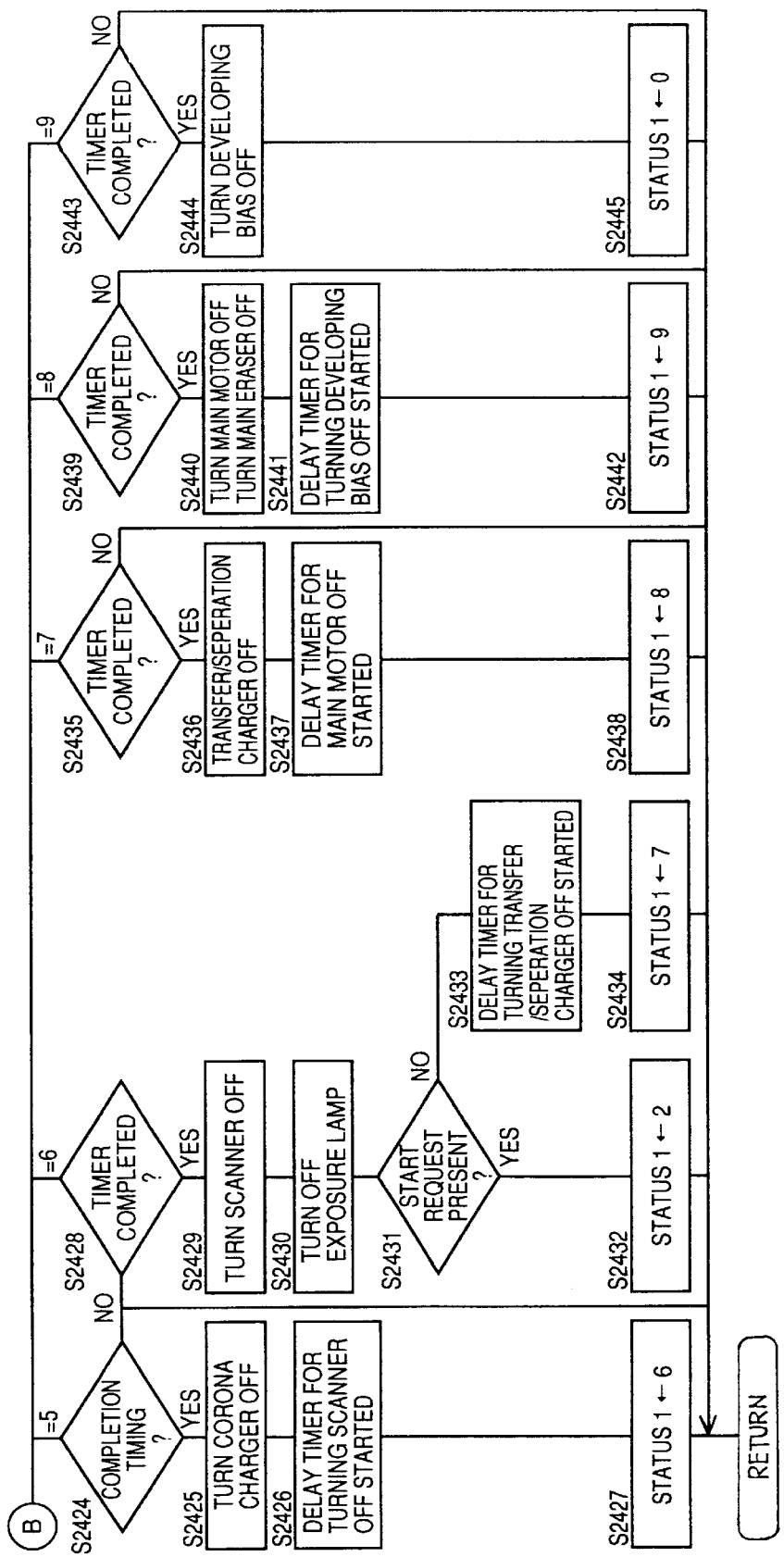
FIG. 17 is the other part of the flow for use in illustration of the specific content of the image forming processing routine in FIG. 14.

FIGS. 16 and 17 are flow charts showing the specific content of an image forming processing (step S24 in FIG. 14) conducted by the engine CPU. As illustrated in FIG. 16, the value of status 1 is determined in step S2401, and branching to each processing is conducted based on the value.

If the value of status 1 is 0, it is determined if a start request from host CPU 203 is present, and if there is a start request photoreceptor drum 10 is started to rotate, turning on erasure lamp 11, and turning on a developing bias in developing device 13. Then, a delay timer for operating transfer charger 14 and separation charger 15 is started, and the value of status 1 is set to "1" (steps S2402 to S2406).

If the value of status 1 is "1", it is determined if the delay timer has completed counting. If the counting has been completed, transfer charger 14 and separation charger 15 are operated, and the value of status 1 is set to "2" (steps S2407 to S2409).

If the value of status 1 is "2", it is determined if supply of a paper sheet to timing roller 42 has been completed by checking the output of sensor SE4. If setting of the paper sheet has been completed, it is determined if there is an instruction of forcibly discharging the paper sheet from host CPU 203. If there is no such instruction, exposure lamp 21 is illuminated, a delay timer for operating corona charger 12 is started, and then the value of status 1 is set to "3" (steps S2410 to S2414). If there is the instruction, exposure lamp 21, scanner 25 and corona charger 12 are not operated, and a delay timer for turning off transfer charger 14 and separation charger 15 is started, and the value of status 1 is set to "7" (steps S2415 and S2416).

If the value of status 1 is "3", it is determined if the delay timer has completed counting. If the counting has been completed, it is determined if there is an instruction only of discharging a paper sheet from host CPU 203. If there is no such instruction, corona charger 12 is turned on, and a delay timer for starting scanning of document images by scanner 25 is started. Then, the value of status 1 is set to "4" (steps S2417 to S2420).

If the value of status 1 is "4", it is determined if the delay timer has completed counting. If the counting has been completed, scanner 25 is operated, and the value of status 1 is set "5" (steps S2421 to S2423).

As illustrated in FIG. 17, if the value of status 1 is "5", it is determined if exposure scanning has reached to the tail end of a document image. If it has reached there, corona charger 12 is turned off, and a delay timer for stopping scanner 25 is started. Then, the value of status 1 is set to "6" (steps S2424 to S2427).

If the value of status 1 is "6", it is determined if the delay timer has completed counting. If the counting has been completed, scanner 25 and exposure lamp 21 are turned off. Then, it is determined if there is a start request from host CPU 203, and if such a start request is in progress, the value of status 1 is set to "2", and a processing for forming the next image is continued. If such a start request is not in progress anymore, the delay timer for turning off transfer charger 14 and separation charger 15 is started, and the value of status 1 is set to "7" (steps S2428 to S2434).

If the value of status 1 is "7", it is determined if the delay timer has completed counting. If the counting has been completed, transfer charger 14 and separation charger 15 are turned off, and a delay timer for stopping the rotation of photoreceptor drum 10 is started, setting the value of status 1 to "8" (steps 2435 to S2438).

If the value of status 1 is "8", it is determined if the delay timer has completed counting. If the counting has been completed, the rotation of photoreceptor drum 10 is stopped, and eraser lamp 11 is turned off. A delay timer for turning off the developing bias is started, and the value of status 1 is set to "9" (steps S2439 to S2442).

If the value of status 1 is "9", it is determined if the delay timer has completed counting, and if the counting has been completed, the developing bias is turned off, and the value of status 1 is set to "0" (steps S2443 to S2445).

Figure 18:
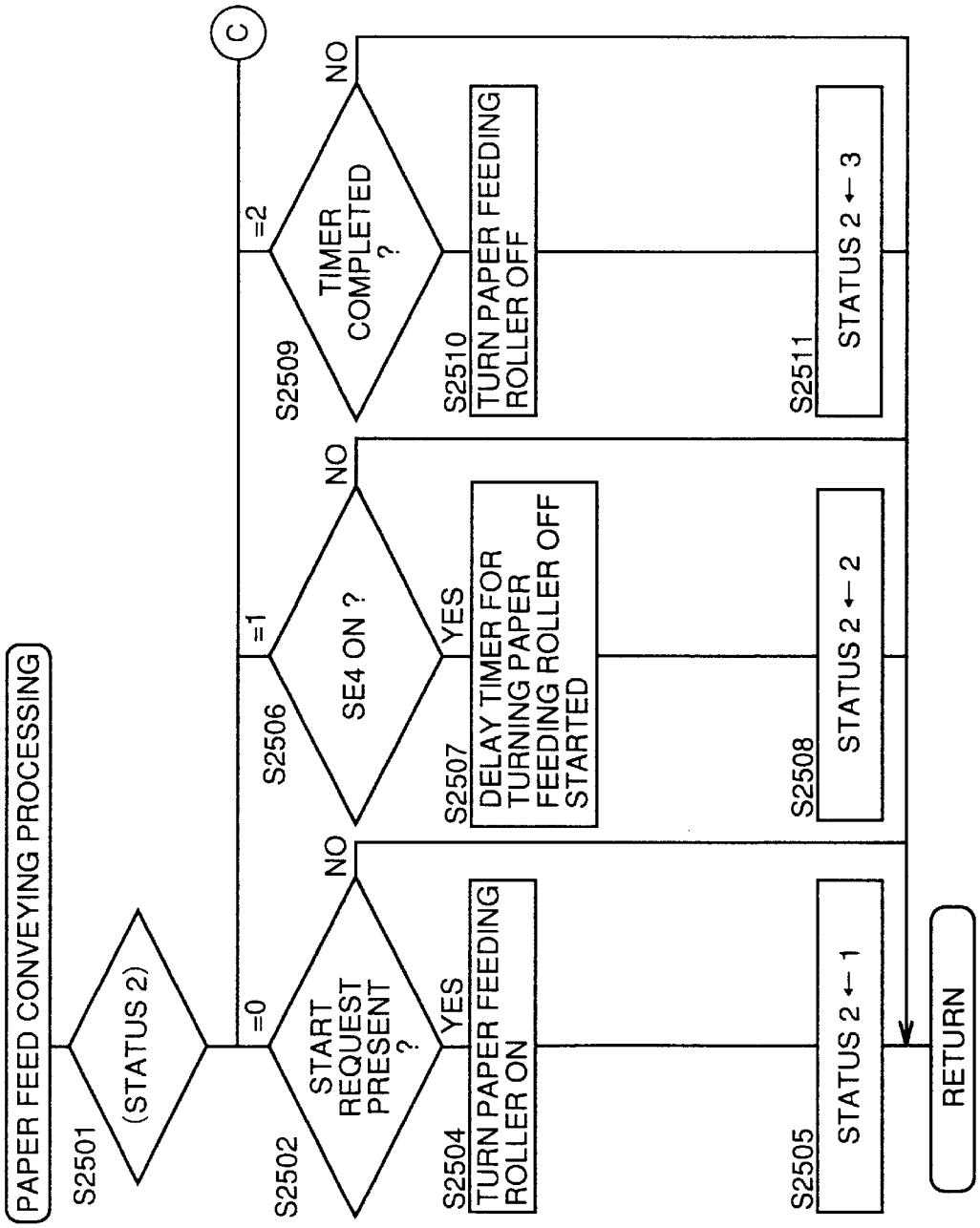
FIG. 18 is a part of a flow chart for use in illustration of the specific content of the paper feed conveying processing routine in FIG. 14.

FIG. 18 is a flow chart showing in detail the content of a paper feeding conveying processing (step S25 in FIG. 14). As illustrated in FIG. 18, the value of status 2 is determined in step S2501, and the process branches to various processings.

If the value of status 2 is "0", it is determined if there is a start request is present in step S2502. If there is a start request, one of paper feeding rollers 41a and 41b is operated in response to a selected sheet size, and paper feeding is started. Then, the value of status 2 is set to "1" (steps S2502 to S2505).

If the value of status 2 is "1", an output from sensor SE4 is checked. If sensor SE4 is ON, it is determined that a paper sheet has reached the vicinity of timing roller 42, and a delay timer for turning off the paper feeding rollers is started, and the value of status 2 is set to "2" (steps S2506 to S2508).

If the value of status 2 is "2", it is determined if the delay timer has completed counting. If the counting has been completed, the paper feeding rollers are turned off, and the value of status 2 is set to "3" (steps S2509 to S2511).

Figure 19:
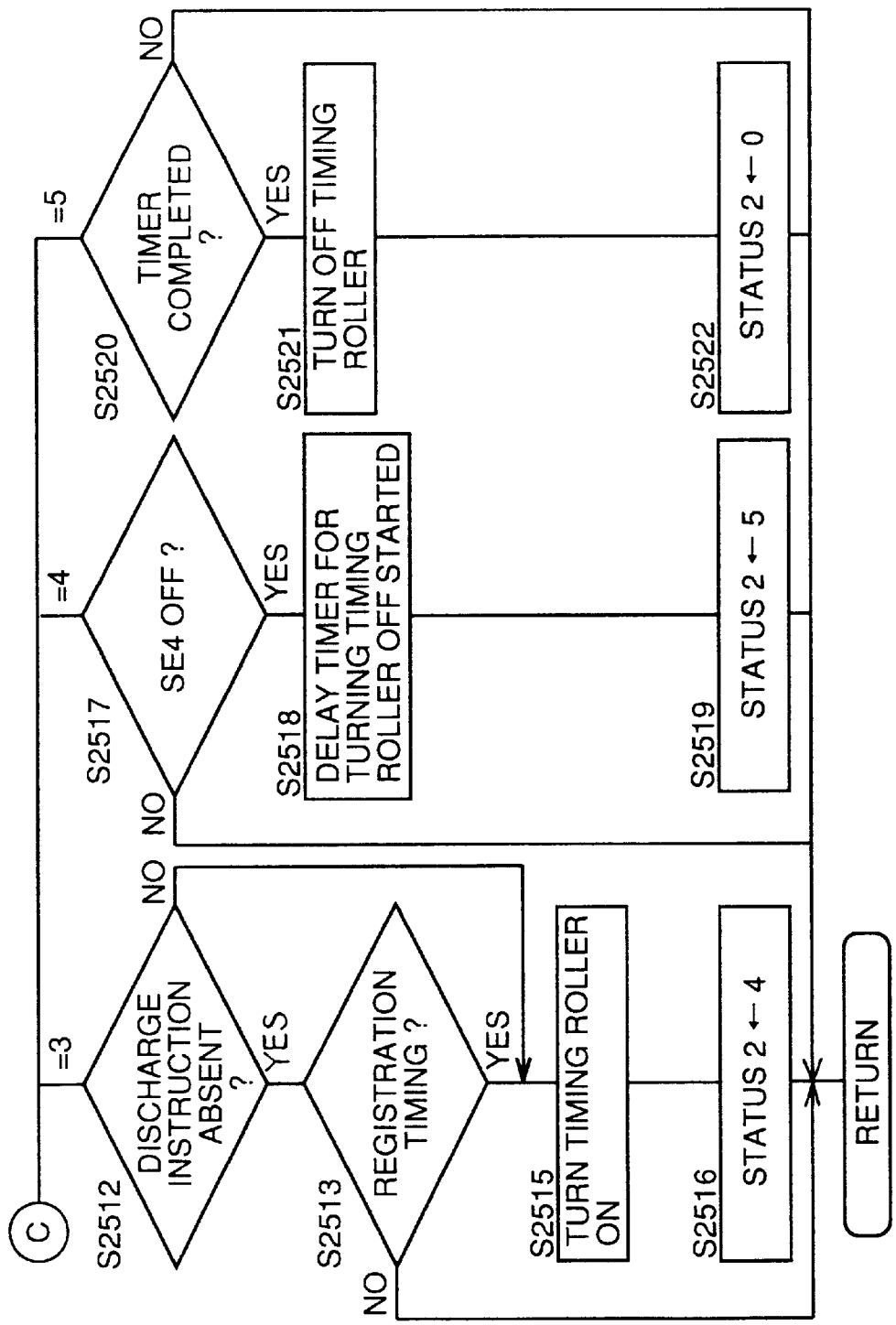
FIG. 19 is the other part of the flow chart for use in illustration of the specific content of the paper feed conveying processing routine in FIG. 14.

As illustrated in FIG. 19, if the value of status 2 is "3", it is determined if there is an instruction of forcibly discharging a paper sheet from host CPU 203 in step S2512. If there is no such instruction, the process moves to step 2513 and it is determined if it is a registration timing. The registration timing is a timing for matching the tip end of a paper sheet and the tip end of an image on the photoreceptor, a timer therefor is started when scanner 25 during scanning reaches the tip end position of a document image, and the timing is reached when the counting by the timer is completed. If the registration timing is reached, the process proceeds to step S2515, and otherwise returns. If there is an instruction of forcibly discharging a paper sheet, the process proceeds to step S2515. In step S2515, timing roller 42 is operated, and then the value of status 2 is set to "4" in step S2516.

If the value of status 2 is "4", an output from sensor SE4 is checked. If sensor SE4 is off, it is determined that a paper sheet has passed, then a delay timer for turning off timing roller 42 is started, and the value of status 2 is set to "5" (steps S2517 to S2519). If the value of status 2 is "5", it is determined if the delay timer has completed counting. If the counting has been completed, timing roller 42 is turned off, and the value of status 2 is set to "0" (steps S2520 to S2522).

Figure 20:
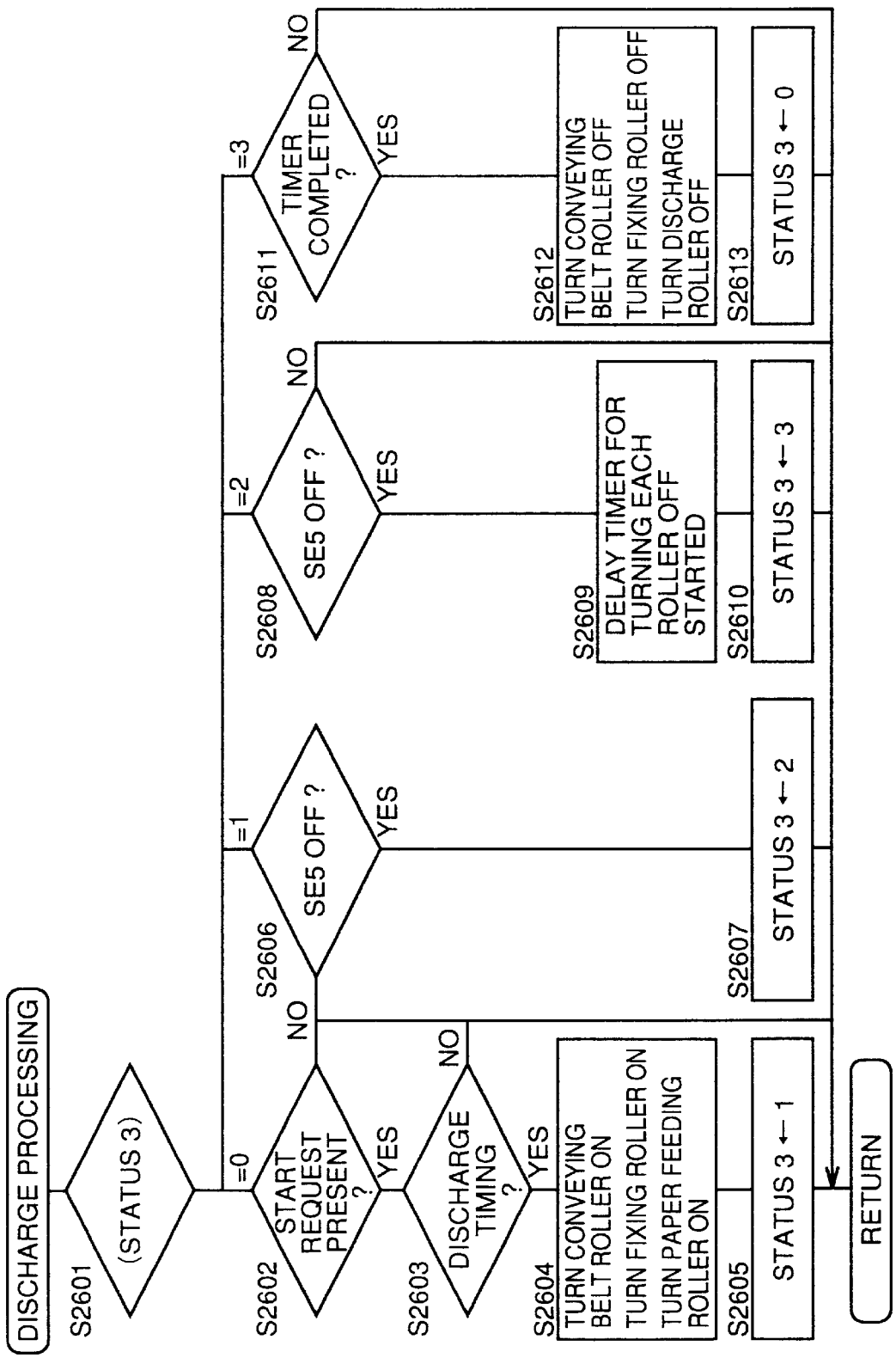
FIG. 20 is a flow chart for use in illustration of the specific content of the discharge processing routine in FIG. 14.

FIG. 20 is a flow chart showing in detail the content of a discharge processing (step S26 in FIG. 14). As illustrated in FIG. 20, the value of status 3 is determined in step S2601 and the process branches according to the value.

If the value of status 3 is "0", it is determined if there is a start request in progress to engine CPU 204. With such a start request in progress, in a discharge timing in other words after a prescribed time period since the operation of timing roller 42, conveying belt 43, fixing roller 44 and discharge roller 45 are turned on. The value of status 3 is set to "1" (steps S2602 to S2605).

If the value of status 3 is "1", the output of sensor SE5 is checked, and if sensor SE5 is on, it is determined that the tip end of the sheet has reached the vicinity of discharge roller 45, and the value of status 3 is set to "2" (steps S2606 and S2607).

If the value of status 3 is "2", the output of sensor SE5 is checked, and if sensor SE5 is off, it is determined that the tail end of the paper sheet has reached the vicinity of discharge roller 45, and a delay timer for turning off this roller is started. Then the value of status 3 is set to "3" (steps S2608 to S2610).

If the value of status 3 is "3", it is determined if the delay timer has completed counting. If the counting has been completed, each roller is turned off, and the value of status 3 is set to "0" (steps S2611 to S2613).

The processing by ADFCPU 205 will be now described in detail. As is the case with engine CPU 204, operation of power supply switch 2 supplies power to ADFCPU 205, and ADFCPU5 starts processing. If, however, host CPU 203 determines that ADFCPU 205 is abnormal, power is not supplied to ADFCPU 205.

FIG. 21 is a flow chart showing a main routine of processing by ADFCPU 205. As illustrated in FIG. 21, after an initialization processing for the CPUs at the time of power supply or at the time of resetting due to an uncontrollable state of the CPUs, the internal timer defining time required for one routine is started (steps S31 and S32). Then, sequentially conducted are a data reception processing for communication with host CPU 203 (step S33), a document feeding processing for feeding a document to document station 19 from document tray 31 (step S34), a document discharge processing for discharging a document (step S35) and other processings (step S37). In step S38, the process returns to step S32 when the internal timer is completed.

The initialization processing in step S31 is the same as the initialization processing for the engine CPU shown in FIG. 15, and therefore a description thereof will not repeated here.

Figure 22:
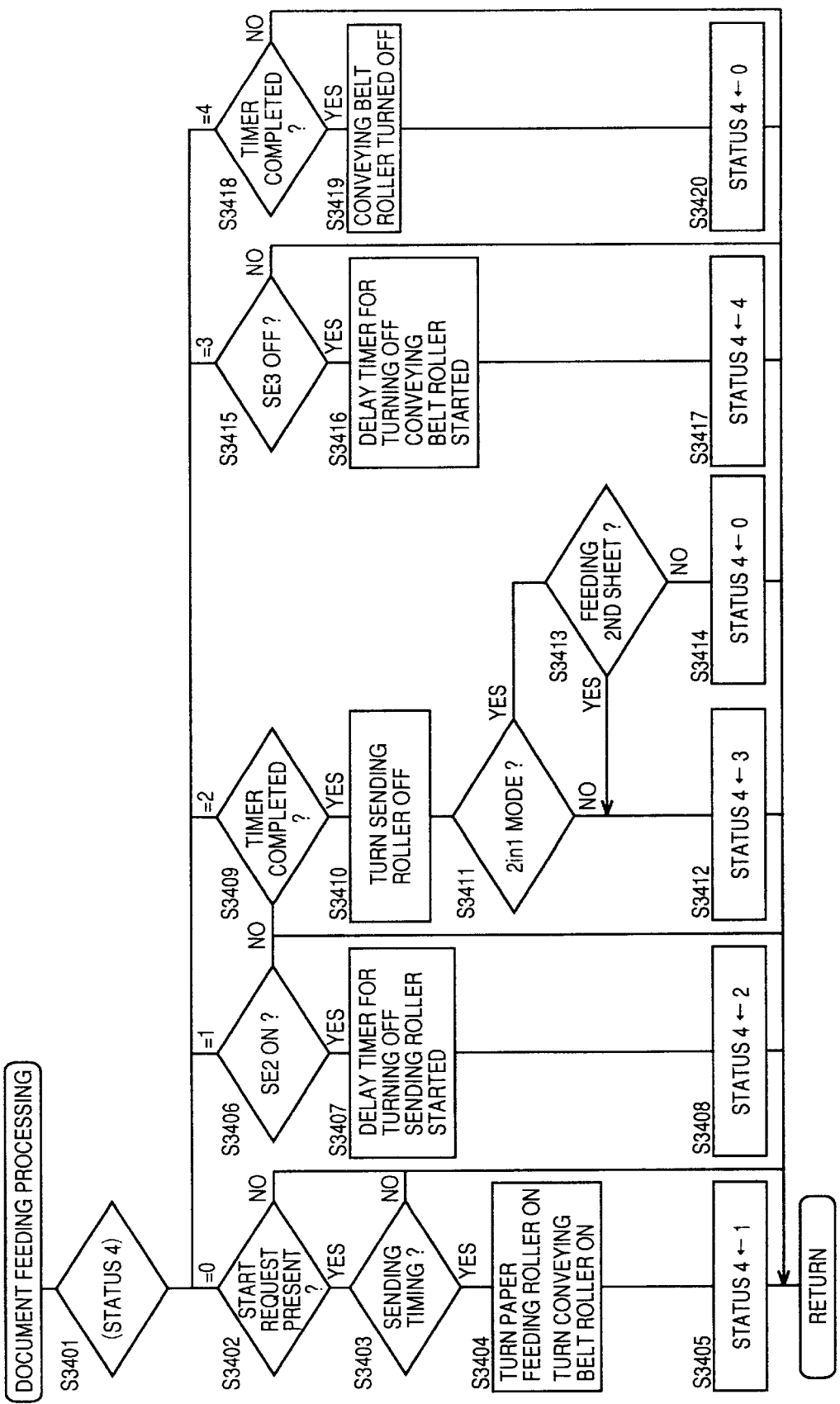
FIG. 22 is a flow chart for use in illustration of the specific content of the document sending processing routine in FIG. 21.

FIG. 22 is a flow chart showing in detail the content of the document feeding processing (step S34 in FIG. 21). As illustrated in FIG. 22, the value of status 4 is determined in step S3401, and the process branches according to the value.

If the value of status 4 is "0", it is determined if there is a start request in progress to ADFCPU 205. If there is a start request in progress, in a paper feeding timing in other words immediately after a copying operation is started or when a discharge of the previous document is completed, paper feeding roller 32 and conveying belt 33 are operated. Then, the value of status 4 is set to "1" (steps S3402 to S3405).

If the value of status 4 is "1", the output of sensor SE2 is checked. If sensor SE2 is on, it is determined that a document has reached the vicinity of conveying belt 33, a delay timer for turning off paper feeding roller 32 is started, and the value of status 4 is set to "2" (steps S3406 to S3408).

If the value of status 4 is "2", it is determined if the delay timer has completed counting. If the counting has been completed, sending roller 32 is turned off, then, it is determined if the 2 in 1 mode is set at present, and if the 2 in 1 mode is not set, the value of status 4 is set to "3" and the process returns. When the first document sheet is sent in the 2 in 1 mode, the value of status 4 is set to "0" and the process returns in order to send the next document. At the time of sending the first document sheet in the 2 in 1 mode, the value of status 4 is set "3" (steps S3409 to S3414).

If the value of status 4 is "3", the output of sensor SE2 is checked, and if sensor SE2 is off, it is determined that a document has been completely set on the document station, and a delay timer for operating conveying belt 33 is started, and the value of status 4 is set to "4" (steps S3415 to S3417).

If the value of status 4 is "4", it is determined if the delay timer has completed counting. If the counting has been completed, conveying belt 33 is turned off, and the value of status 4 is set to "0" (steps S3418 to S3420).

Figure 23:
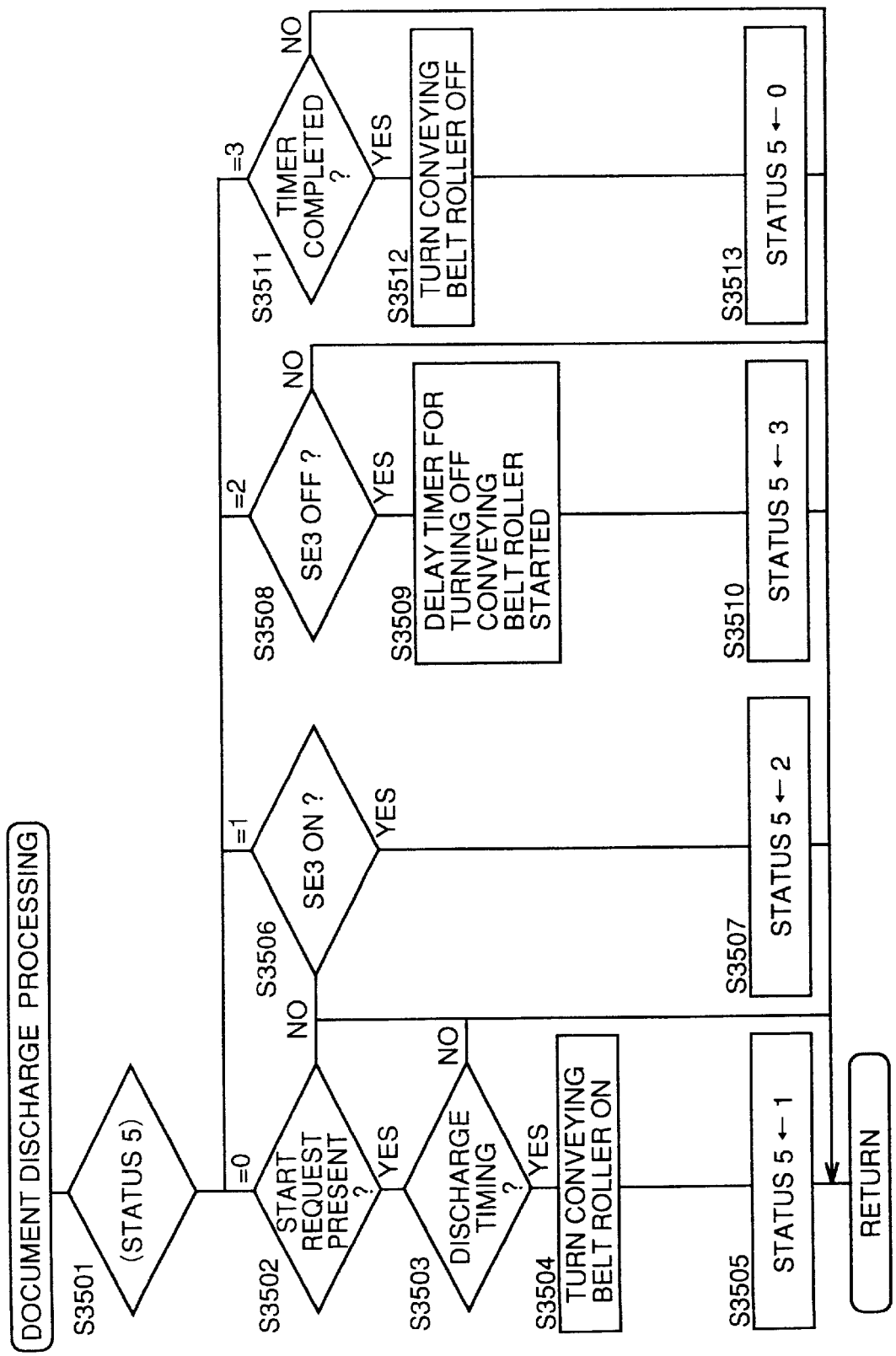
FIG. 23 is a flow chart for use in illustration of the specific content of the document discharge processing routine in FIG. 21.

FIG. 23 is a flow chart showing in detail the content of the paper discharge processing (step S35 in FIG. 21). As illustrated in FIG. 23, the value of status 5 is determined in step S3501, and the process branches according to the value.

If the value of status 5 is "0", it is determined if there is a start request in progress to ADFCPU 205, and if there is such a start request in progress, in a discharge timing, in other words when copying of documents set at document station 19 is all completed, conveying belt 33 is turned on, Then, the value of status 5 is set to "1" (steps S3502 to S3505).

If the value of status 5 is "1", the output of sensor SE3 is checked, and if sensor SE3 is on, it is determined that the tip end of a document has reached the vicinity of discharge tray 35, and the value of status 5 is set to "2" (steps S3506 to S3507).

If the value of status 5 is "2", the output of sensor SE3 is checked, and if sensor SE3 is off, it is determined that the tail end of a document has reached the vicinity of conveying belt 33, and the delay timer for turning off conveying belt 33 is started. Then, the value of status 5 is set to "3" (steps S3508 to S3510).

If the value of status 5 is "3", it is determined if the timer has completed counting. If the counting has been completed, conveying belt 33 is turned off. Then, the value of status 5 is set to "0" (steps S3511 to S3513).

Thus, in this embodiment, the number of time up of a watchdog timer, in other words the number of uncontrollable states attained by a CPU is stored in an RAM, and therefore even if the copying machine returns to its normal operation after resetting the CPU, the history that the CPU attained an uncontrollable state can be known by reading out the storage content from the RAM later, and therefore a malfunctioning CPU can be found.

Note that although in this embodiment the machine having an engine CPU and an ADFCPU has been described by way of illustration the invention is not limited to the above, and the same control may be conducted to a CPU for controlling an option instrument in a copying machine such as a sorter and a finisher.

Also in this embodiment, copying conditions such as copying density and copying magnification as well as copying modes are referred to as backup data, but data may indicate to which bin paper sheets are discharged at present in the case of a sorter, for example. The remaining number of copying may be controlled on the side of a sub CPU, and the remaining number may be used as backup data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising: a microprocessor for conducting a processing for an image forming operation, and an abnormality monitoring circuit for monitoring the operation of said microprocessor and transmitting a reset signal to said microprocessor when an abnormality is detected, thereby resetting said microprocessor, said abnormality monitoring circuit includes first storage means for storing how many times the reset signal is transmitted.

2. An image forming apparatus as recited in claim 1, further comprising display means for displaying the storage content of said first storage means.

3. An image forming apparatus as recited in claim 1, further comprising:

second storage means for storing a state of said microprocessor until said microprocessor is reset by said abnormality monitoring circuit; and restoration means for returning said microprocessor to the state before the resetting based on the content of said second storage means, after said microprocessor is reset by said abnormality monitoring circuit.

4. An image forming apparatus comprising:

a document conveying device for sequentially conveying a plurality of documents and setting the documents at a copying position;

a copying device for copying the documents set at the copying position by said document conveying device;

a first microprocessor for controlling an operation of said document conveying device;

a second microprocessor for controlling an operation of said copying device;

a third microprocessor connected to said first microprocessor and said second microprocessor for monitoring operation states of said first microprocessor and said second microprocessor;

said third microprocessor having control means for storing information indicating the operation state of said first microprocessor when an abnormality of said first microprocessor is detected when the documents are set at the copying position by said document conveying device, and outputting an instruction requesting conveying a next document to said copying position, said instruction is output to said first microprocessor after said storing is completed; and reset means for resetting said first microprocessor for reactivation when an abnormality occurs in said first microprocessor, wherein said first microprocessor initializes itself based on the stored information in response to said resetting, and resumes conveying a document to the copying position based on the instruction to the first microprocessor from said third microprocessor.

5. An image forming apparatus comprising:

a document conveying device for sequentially conveying a plurality of documents and setting the documents at a copying position;

a copying device for copying the documents set at the copying position by said document conveying device;

a first microprocessor for controlling the operation of said document conveying device;

a second microprocessor for controlling the operation of said copying device; and a third microprocessor connected to said first microprocessor and said second microprocessor for monitoring the operation states of said first microprocessor and said second microprocessor, said third microprocessor having control means for outputting an instruction of interrupting operation to said first microprocessor when an abnormality in said first microprocessor is detected during a copying operation by said copying device and during conveying of a document by said document conveying device, and outputting an instruction of interrupting the next copying operation to said second microprocessor after a discharge operation of a copy sheet within said copying device is completed.

6. An image forming apparatus as recited in claim 5, wherein said control means stores information indicating the state of said first microprocessor when an abnormality in said first microprocessor is detected, and cancels said instruction of interruption when it is determined that the document being conveyed has been removed from said document conveying device after said storing is completed.

7. An image forming apparatus, comprising:

a document conveying device for sequentially conveying a plurality of documents and setting the documents at a copying position;

a copying device for copying the documents set at the copying position by said document conveying device;

a first microprocessor for controlling the operation of the document conveying device;

a second microprocessor for controlling the operation of said copying device;

a third microprocessor connected to said first microprocessor and said second microprocessor for monitoring the operation states of said first microprocessor and said second microprocessor, said third microprocessor having control means for storing information indicating the state of said first microprocessor when an abnormality in said first microprocessor is detected during a copying operation for copying a document set at the copying device by manual operation without using said document conveying device; and reset means for resetting said first microprocessor for reactivation when an abnormality occurs in said first microprocessor, wherein said first microprocessor initializes itself based on said stored information in response to said resetting.

8. An image forming apparatus, comprising:

a document conveying device for sequentially conveying a plurality of documents and setting the documents at a copying position;

a copying device for copying the documents set at the copying position by said document conveying device;

a first microprocessor for controlling the operation of said document conveying device;

a second microprocessor for controlling the operation of said copying device; and a third microprocessor connected to said first microprocessor and said second microprocessor for monitoring the operation states of said first microprocessor and said second microprocessor, said third microprocessor having control means for instructing interruption of copying to said second microprocessor when an abnormality in said second microprocessor is detected during a copying operation, and instructing interruption of sending of the next document to said first microprocessor after setting of a document by said document conveying device to the copying position is completed.

9. An image forming apparatus, comprising:

a first microprocessor;

a second microprocessor, said first and second microprocessors cooperating with each other to control an image forming operation;

a monitoring circuit for monitoring the operations of said first and second microprocessors and transmitting a reset signal to a microprocessor with an abnormality when such an abnormality occurs; and a third microprocessor, when an abnormality occurs in one microprocessor, for determining an image forming operation controllable only by the other microprocessor and making said the other microprocessor execute said determined image forming operation.

10. An image forming apparatus as recited in claim 9, wherein
said first microprocessor controls a document conveying operation, and said second microprocessor controls a copying operation of the conveyed document.

11. An image forming apparatus comprising:

a microprocessor for controlling an image forming operation;

a monitoring circuit for monitoring the operation of said microprocessor, and transmitting a reset signal to said microprocessor when an abnormality occurs; and a memory for storing the state of said microprocessor before the reset signal is transmitted by said monitoring circuit, wherein said microprocessor has means for re-setting itself to the state before being reset based on the state stored in said memory in response to said transmitted reset signal.

* * * * *